(12) United States Patent
Hajiloo et al.

(10) Patent No.: US 11,787,394 B2
(45) Date of Patent: Oct. 17, 2023

(54) SUPERVISORY CONTROL FOR E-AWD AND E-LSD

(71) Applicant: GM Global Technology Operations LLC, Detroit, MI (US)

(72) Inventors: Reza Hajiloo, Waterloo (CA); SeyedAlireza Kasaiezadeh Mahabadi, Novi, MI (US); Shamim Mashrouteh, Markham (CA); Seyedeh Asal Nahidi, North York (CA); Ehsan Asadi, North York (CA); Yubiao Zhang, Sterling Heights, MI (US); Bakhtiar B. Litkouhi, Washington, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 140 days.

(21) Appl. No.: 17/539,676

(22) Filed: Dec. 1, 2021

(65) Prior Publication Data
US 2023/0166722 A1 Jun. 1, 2023

(51) Int. Cl.
*B60W 30/02* (2012.01)
*B60W 40/12* (2012.01)
(Continued)

(52) U.S. Cl.
CPC ............ *B60W 30/02* (2013.01); *B60W 40/08* (2013.01); *B60W 40/10* (2013.01); *B60W 40/12* (2013.01);
(Continued)

(58) Field of Classification Search
CPC ...... B60W 30/02; B60W 40/08; B60W 40/10; B60W 40/12; B60W 2520/14;
(Continued)

(56) References Cited

U.S. PATENT DOCUMENTS 6,360,156 B1 * 3/2002 Morganroth ....... B60K 17/3505
701/72
9,296,374 B2 * 3/2016 Yamakado ........... B60W 40/114
(Continued)

FOREIGN PATENT DOCUMENTS

JP 2004156669 A * 6/2004 ........... B60K 28/165

OTHER PUBLICATIONS

JP-2004156669-A translation (Year: 2004).*
(Continued)

*Primary Examiner* — Jeff A Burke
*Assistant Examiner* — Kyle T Johnson
(74) *Attorney, Agent, or Firm* — Vivacqua Crane PLLC

(57) ABSTRACT

A system for supervisory control for eAWD and eLSD in a motor vehicle includes a control module, and sensors and actuators disposed on the motor vehicle. The sensors measure real-time motor vehicle data, and the actuators alter behavior of the motor vehicle. The control module receives the real-time data; receives one or more driver inputs to the motor vehicle; determines a status of a body of the motor vehicle; determines a status of axles of the motor vehicle; determines a status of each wheel of the motor vehicle; and generates a control signal to the actuators from the driver inputs and the body, axle, and wheel statuses. The control module also exercises supervisory control by actively adjusting constraints on the control signal to each of the actuators where actively adjusting constraints on the control signal alters boundaries of control actions in response to the one or more driver inputs.

20 Claims, 8 Drawing Sheets

(51) Int. Cl.
  *B60W 40/10* (2012.01)
  *B60W 40/08* (2012.01)
(52) U.S. Cl.
  CPC ..... *B60W 2520/14* (2013.01); *B60W 2520/20* (2013.01); *B60W 2520/28* (2013.01); *B60W 2530/20* (2013.01); *B60W 2540/10* (2013.01); *B60W 2720/40* (2013.01)
(58) Field of Classification Search
  CPC ......... B60W 2520/20; B60W 2520/28; B60W 2530/20; B60W 2540/10; B60W 2720/40
  See application file for complete search history.

(56) References Cited

U.S. PATENT DOCUMENTS

| | | | | |
|---|---|---|---|---|
| 2006/0074530 | A1* | 4/2006 | Meyers | B60W 10/119 701/1 |
| 2017/0137012 | A1* | 5/2017 | Mao | B60W 10/08 |
| 2019/0135262 | A1* | 5/2019 | Gaither | B60W 20/10 |
| 2020/0217405 | A1* | 7/2020 | Dumas | F16H 48/08 |
| 2023/0133240 | A1* | 5/2023 | Oh | B60W 30/00 475/86 |
| 2023/0139179 | A1* | 5/2023 | Askari | B60W 40/13 701/1 |
| 2023/0140485 | A1* | 5/2023 | Nahidi | B60W 40/114 701/38 |
| 2023/0166722 | A1* | 6/2023 | Hajiloo | B60W 30/02 701/36 |

OTHER PUBLICATIONS

An Intelligent Control of Electronic Limited Slip Differential (Year: 2021).*

Model Predictive Control of an All Wheel Drive Vehicle (Year: 2019).*

* cited by examiner

SUPERVISORY CONTROL FOR E-AWD AND E-LSD

INTRODUCTION

The present disclosure relates to control systems for motor vehicles, and more specifically to systems and methods for accurately modeling vehicle control actions and adjusting the vehicle control actions when they differ from expected behavior.

Static and dynamic motor vehicle control systems are increasingly being used to manage a wide variety of static and dynamic motor vehicle performance characteristics. This is especially true with respect to challenging driving scenarios involving tire slip. In such challenging driving scenarios, control actions such as wheel and/or axle torques, as well as body motion control should be allocated in an optimal manner such that tire capacity is fully utilized in longitudinal and lateral directions. Body motion control, wheel and/or axle torques are managed by on-board computing platforms or controllers, sensors, and actuators.

While current systems and methods modeling vehicle control actions operate for their intended purpose, there is a need for new and improved systems and methods of modeling vehicle control actions that enhance vehicle stability in complex driving scenarios and which provide increased driver control, adjust vehicle control actions to maintain expected vehicle behavior, provide increased force generation at the tire/road interface or contact patch while also maintaining or reducing cost and complexity, reducing calibration efforts, and improving simplicity, and while also providing increased redundancy and robustness.

SUMMARY

According to several aspects, a system for supervisory control for eAWD and eLSD in a motor vehicle includes one or more sensors disposed on the motor vehicle, the one or more sensors measuring real-time static and dynamic data about the motor vehicle. The system further includes one or more actuators disposed on the motor vehicle, the one or more actuators altering static and dynamic behavior of the motor vehicle. The system further includes a control module having a processor, a memory, and input/output (I/O) ports, the control module executing program code portions stored in the memory. The program code portions include a first program code portion that receives, via the I/O ports, the real-time static and dynamic data from the one or more sensors. The program code portions further include a second program code portion that receives, via the I/O ports, one or more driver inputs to the motor vehicle. The program code portions further include a third program code portion that determines a status of a body of the motor vehicle. The program code portions further include a fourth program code portion that determines a status of axles of the motor vehicle. The program code portions further include a fifth code portion that determines a status of each wheel of the motor vehicle. The program code portions further include a sixth program code portion that generates a control signal to the one or more actuators based on the driver inputs and based on the outputs of the third, fourth, and fifth program code portions. The program code portions further include a seventh program code portion that exercises supervisory control over at least the second and the sixth program code portions by actively adjusting constraints on the control signal to each of the one or more actuators based on the status of the body, the status of the axles, and the status of each wheel of the motor vehicle. Actively adjusting constraints on the control signal alters boundaries of control actions in response to the one or more driver inputs.

According to another aspect of the present disclosure the first program code portion further includes program code for receiving real-time static and dynamic data from one or more of: inertial measurement units (IMUs) capable of measuring position, orientation, acceleration, and velocity in at least three dimensions; wheel speed sensors capable of measuring angular speeds of each of the wheels of the motor vehicle; throttle position sensors capable of measuring a throttle position of the motor vehicle; accelerator position sensors capable of measuring a position of an accelerator pedal of the motor vehicle; and tire pressure monitoring sensors capable of measuring pressures of tires of the motor vehicle. The real-time static and dynamic data further includes: lateral velocity of the motor vehicle; longitudinal velocity of the motor vehicle; yaw rate of the motor vehicle; wheel angular velocity; and longitudinal, lateral, and normal forces on each tire of the motor vehicle.

According to yet another aspect of the present disclosure the third program code portion further includes program code portions that: communicate via the I/O ports with a body control module; receive, by the body control module, data from the one or more sensors; and ascertain a stability status of the body of the motor vehicle. The stability status of the body includes: at least a yaw rate, a sideslip angle, and a longitudinal speed. When the stability status of the body is within predefined stability margins, the body control module sends a positive indicator to the seventh program code portion; and when the stability status of the body is not within predefined stability margins, the body control module sends a negative indicator to the seventh program code portion. In response to a positive indicator, the seventh program code portion selectively commands additional torque transfer to one or more of the wheels or axles, and in response to a negative indicator, the seventh program code portion halts torque transfer to one or more of the wheels or axles.

According to yet another aspect of the present disclosure the stability status of the body is detected by comparing a measured yaw rate and a sideslip angle. The stability margins of the body are defined by:

$$r_{\substack{max\\min}} = \pm \frac{\mu g \xi_r}{v_x}; \text{ and}$$

$$\beta_{\substack{max\\min}} = \pm a\tan\left(\frac{3\xi\mu F_z}{C_{\alpha r}}\right) + \frac{l_r r}{v_x}$$

where r is the yaw rate, $\beta$ is the sideslip angle, $v_x$ is a longitudinal speed, $l_r$ is a distance from a center of gravity of the motor vehicle to the rear axle, $l_f$ is the distance from the center of gravity to a front axle, l is the distance between front and rear axles, m is total mass of the motor vehicle, $\mu$ is a coefficient of friction of the road, and $C_\alpha$ is tire cornering stiffness.

According to still another aspect of the present disclosure the fourth program code portion further include program code portions that: communicate, via the I/O ports, with an axle monitoring module. The program code portions also receive, by the axle monitoring module, data from the one or more sensors, and ascertain a stability status of the axles of the motor vehicle. Ascertaining a stability status of the axles includes: ascertaining tire slip angles and slip ratios of each of the tires of the motor vehicle. When the tires have exceeded predetermined tire slip angles and tire slip ratios, the program code portions determine that predetermined tire stability margins have been exceeded. Similarly, when the tires have not exceeded predetermined tire slip angles and tire slip ratios, the program code portions determine that predetermined tire stability margins have not been exceeded. When the tire stability margins have been exceeded the axle monitoring module sends a negative indicator to the seventh program code portion and when the tires have not exceeded predetermined tire stability margins the axle monitoring module sends a positive indicator to the seventh program code portion. In response to a positive indicator, the seventh program code portion selectively commands additional torque transfer to one or more of the axles, and in response to a negative indicator, the seventh program code portion halts torque transfer to one or more of the axles.

According to yet another aspect of the present disclosure the stability status of the axles of the motor vehicle is defined by a saturation level of the axles in terms of the slip angles α of the tires $$\alpha_{lim} = \operatorname{atan}\left(\frac{3\xi\mu F_z}{C_{\alpha r}}\right)$$

where $F_z$ is tire normal load, $C_\alpha$ is tire stiffness, and μ is a coefficient of friction of the road.

According to still another aspect of the present disclosure the fifth program code portion further includes program code portions that: communicate, via the I/O ports, with a wheel stability module; receive, by the wheel stability module data from the one or more sensors; and ascertain a stability status of the wheels of the motor vehicle. The stability status of the wheels includes estimated slip ratios of each tire of the motor vehicle.

According to still another aspect of the present disclosure when the estimated slip ratios exceed predetermined stability margins, the wheel stability module sends a negative indicator to the seventh program code portion, and when the estimated slip ratios do not exceed predetermined stability margins, the wheel stability module sends a positive indicator to the seventh program code portion. In response to a positive indicator the seventh program code portion selectively commands additional torque transfer to one or more of the wheels. In response to a negative indicator the seventh program code portion halts torque transfer to one or more of the wheels.

According to yet another aspect of the present disclosure the sixth program code portion further includes program code portions that: receive driver inputs including steering and torque requests; receive the stability status of the body, the axles, and the wheels of the motor vehicle; and based on the actuator types of the one or more actuators equipped to the motor vehicle, and based on the stability status of the body, the axles, and the wheels of the motor vehicle, the system generates the control signal to the one or more actuators.

According to still another aspect of the present disclosure the seventh program code portion further includes program code portions that: actively optimize constraints for each of the one or more actuators to account for the stability status of the body, the axles, and the wheels of the motor vehicle; and actively adjust control signals to the one or more actuators so that the control signals to the one or more actuators are within boundaries of possible actuator outputs.

According to yet another aspect of the present disclosure a method for supervisory control for eAWD and eLSD in a motor vehicle includes processing static and dynamic motor vehicle information through a control module, the control module having a processor, a memory, and the I/O ports, the control module executing program code portions stored in the memory. The program code portions: measure real-time static and dynamic data with one or more sensors disposed on the motor vehicle, and utilize one or more actuators disposed on the motor vehicle to alter static and dynamic behavior of the motor vehicle. The program code portions also receive, via the I/O ports, the real-time static and dynamic data from the one or more sensors, and receive, via the I/O ports, one or more driver inputs to the motor vehicle. The program code portions also determine a status of a body of the motor vehicle, determine a status of axles of the motor vehicle, determine determining a status of each wheel of the motor vehicle, and generate a control signal to the one or more actuators based on the driver inputs. Based on the status of the body, the axles, and each wheel of the motor vehicle, the program code portions exercise supervisory control over at least the driver inputs and the control signal to the one or more actuators by actively adjusting constraints on the control signal to each of the one or more actuators. Actively adjusting constraints on the control signal alters boundaries of control actions in response to the one or more driver inputs.

According to yet another aspect of the present disclosure the method for supervisory control for eAWD and eLSD in a motor vehicle further includes receiving real-time static and dynamic data from one or more of: inertial measurement units (IMUs) capable of measuring position, orientation, acceleration, and velocity in at least three dimensions; wheel speed sensors capable of measuring angular speeds of each of the wheels of the motor vehicle; throttle position sensors capable of measuring a throttle position of the motor vehicle; accelerator position sensors capable of measuring a position of an accelerator pedal of the motor vehicle; and tire pressure monitoring sensors capable of measuring pressures of tires of the motor vehicle. The real-time static and dynamic data further includes: lateral velocity of the motor vehicle; longitudinal velocity of the motor vehicle; yaw rate of the motor vehicle; wheel angular velocity; and longitudinal, lateral, and normal forces on each tire of the motor vehicle.

According to yet another aspect of the present disclosure the method for supervisory control for eAWD and eLSD in a motor vehicle further includes communicating via the I/O ports with a body control module. The method further includes receiving, by the body control module, data from the one or more sensors; and ascertaining a stability status of the body of the motor vehicle. The stability status of the body includes: at least a yaw rate, a sideslip angle, and a longitudinal speed. When the stability status of the body is within predefined stability margins, the method sends by the body control module, a positive indicator to the control module; and when the stability status of the body is not within predefined stability margins, the method sends by the body control module, a negative indicator to the control module. In response to a positive indicator, the control module selectively commands additional torque transfer to one or more of the wheels or axles, and in response to a negative indicator, the control module halts torque transfer to one or more of the wheels or axles.

According to yet another aspect of the present disclosure the method for supervisory control for eAWD and eLSD in a motor vehicle further includes ascertaining a stability status of the body by comparing a measured yaw rate and a sideslip angle. Stability margins of the body are defined by:

$$r_{min}^{max} = \pm \frac{\mu g \xi_r}{v_x}; \text{ and}$$

$$\beta_{min}^{max} = \pm a\tan\left(\frac{3\xi\mu F_z}{C_{\alpha r}}\right) + \frac{l_r r}{v_x}$$

where r is the yaw rate, β is the sideslip angle, $v_x$ is a longitudinal speed, $l_r$ is a distance from a center of gravity of the motor vehicle to the rear axle, and $l_f$ is the distance from the center of gravity to a front axle, l is the distance between front and rear axles, m is total mass of the motor vehicle, μ is a coefficient of friction of the road, and $C_\alpha$ is tire cornering stiffness.

According to yet another aspect of the present disclosure the method for supervisory control for eAWD and eLSD in a motor vehicle further includes communicating, via the I/O ports, with an axle monitoring module, receiving, by the axle monitoring module, data from the one or more sensors; and ascertaining a stability status of the axles of the motor vehicle. Ascertaining the stability status of the axles includes: ascertaining tire slip angles and slip ratios of each of the tires of the motor vehicle, and when the tires have exceeded predetermined tire slip angles and tire slip ratios, determining that predetermined tire stability margins have been exceeded, and when the tires have not exceeded predetermined tire slip angles and tire slip ratios, determining that predetermined tire stability margins have not been exceeded. When the tire stability margins have been exceeded the axle monitoring module sends a negative indicator to the control module and when the tires have not exceeded predetermined tire stability margins the axle monitoring module sends a positive indicator to the control module. In response to a positive indicator, the control module selectively commands additional torque transfer to one or more of the axles, and in response to a negative indicator, the control module halts torque transfer to one or more of the axles.

According to yet another aspect of the present disclosure ascertaining a stability status of the axles of the motor vehicle further includes defining the stability status of the axles of the motor vehicle is through a saturation level of the axles in terms of the slip angles α of the tires $$\alpha_{lim} = a\tan\left(\frac{3\xi\mu F_z}{C_{\alpha r}}\right)$$

where $F_z$ is tire normal load, $C_\alpha$ is tire stiffness, and μ is a coefficient of friction of the road.

According to yet another aspect of the present disclosure the method for supervisory control for eAWD and eLSD in a motor vehicle further includes communicating, via the I/O ports, with a wheel stability module. The method further includes receiving, by the wheel stability module data from the one or more sensors; and ascertaining a stability status of the wheels of the motor vehicle. The stability status of the wheels includes estimated slip ratios of each tire of the motor vehicle.

According to yet another aspect of the present disclosure the method for supervisory control for eAWD and eLSD in a motor vehicle further includes sending, by the wheel stability module, a negative indicator to the control module when the estimated slip ratios exceed predetermined stability margins; and sending, by the wheel stability module, a positive indicator to the control module when the estimated slip ratios do not exceed predetermined stability margins. In response to a positive indicator the control module selectively commands additional torque transfer to one or more of the wheels, and in response to a negative indicator the control module halts torque transfer to one or more of the wheels.

According to yet another aspect of the present disclosure the method further includes receiving driver inputs including steering and torque requests, receiving the stability status of the body, the axles, and the wheels of the motor vehicle, and generating the control signal based on the types of the one or more actuators equipped to the motor vehicle. Generating the control signal is also based on the stability status of the body, the axles, and the wheels of the motor vehicle. The control signal is adjusted by actively optimizing constraints for each of the one or more actuators to account for the stability status of the body, the axles, and the wheels of the motor vehicle as well as the driver input signal. The control signals to the one or more actuators are within boundaries of possible actuator outputs.

According to yet another aspect of the present disclosure a method for supervisory control for eAWD and eLSD in a motor vehicle includes processing static and dynamic motor vehicle information through a control module, the control module having a processor, a memory, and the I/O ports, the control module executing program code portions stored in the memory. The program code portions perform various tasks including measuring real-time static and dynamic data with one or more sensors disposed on the motor vehicle; utilizing one or more actuators disposed on the motor vehicle to alter static and dynamic behavior of the motor vehicle. The program code portions also receive, via the I/O ports, the real-time static and dynamic data from the one or more sensors, receive via the I/O ports, one or more driver inputs to the motor vehicle, and communicate via the I/O ports with a body control module. The program code portions further receive, by the body control module, data from the one or more sensors; and ascertain a stability status of the body of the motor vehicle. The stability status of the body includes: at least a yaw rate, a sideslip angle, and a longitudinal speed and the stability status is obtained by: comparing a measured yaw rate and a sideslip angle, where stability margins of the body are defined by:

$$r_{min}^{max} = \pm \frac{\mu g \xi_r}{v_x}; \text{ and}$$

$$\beta_{min}^{max} = \pm a\tan\left(\frac{3\xi\mu F_z}{C_{\alpha r}}\right) + \frac{l_r r}{v_x}$$

where r is the yaw rate, β is the sideslip angle, $v_x$ is a longitudinal speed, $l_r$ is a distance from a center of gravity of the motor vehicle to the rear axle, and $l_f$ is the distance from the center of gravity to a front axle, l is the distance between front and rear axles, m is total mass of the motor vehicle, μ is a coefficient of friction of the road, and $C_\alpha$ is tire cornering stiffness. When the stability status of the body is within predefined stability margins, the method sends by the body control module, a positive indicator to the control module; and when the stability status of the body is not within predefined stability margins, the method sends by the body control module, a negative indicator to the control module, In response to a positive indicator, the control module selectively commands additional torque transfer to one or more of the wheels or axles, and in response to a negative indicator, the control module halts torque transfer to one or more of the wheels or axles. The method further includes communicating, via the I/O ports, with an axle monitoring module, receiving, by the axle monitoring module, data from the one or more sensors, and ascertaining a stability status of the axles of the motor vehicle. The stability status of the axles of the motor vehicle is defined through a saturation level of the axles in terms of the slip angles α of the tires where α is defined by:

$$\alpha_{lim} = \operatorname{atan}\left(\frac{3\xi\mu F_z}{C_{\alpha r}}\right)$$

where $F_z$ is tire normal load, $C_\alpha$ is tire stiffness, and μ is a coefficient of friction of the road. Ascertaining the stability status of the axles further includes: ascertaining tire slip angles and slip ratios of each of the tires of the motor vehicle, and when the tires have exceeded predetermined tire slip angles and tire slip ratios, determining that predetermined tire stability margins have been exceeded, and when the tires have not exceeded predetermined tire slip angles and tire slip ratios, determining that predetermined tire stability margins have not been exceeded. When the tire stability margins have been exceeded the axle monitoring module sends a negative indicator to the control module and when the tires have not exceeded predetermined tire stability margins the axle monitoring module sends a positive indicator to the control module. In response to a positive indicator, the control module selectively commands additional torque transfer to one or more of the axles, and in response to a negative indicator, the control module halts torque transfer to one or more of the axles. The method further includes communicating, via the I/O ports, with a wheel stability module, receiving, by the wheel stability module data from the one or more sensors, and ascertaining a stability status of the wheels of the motor vehicle. The stability status of the wheels includes estimated slip ratios of each tire of the motor vehicle. The method further includes sending, by the wheel stability module, a negative indicator to the control module when the estimated slip ratios exceed predetermined stability margins; and sending, by the wheel stability module, a positive indicator to the control module when the estimated slip ratios do not exceed predetermined stability margins. In response to a positive indicator the control module selectively commands additional torque transfer to one or more of the wheels, and in response to a negative indicator the control module halts torque transfer to one or more of the wheels. The method further includes generating a control signal to the one or more actuators based on the driver inputs and based on the status of the body, the axles, and each wheel of the motor vehicle. The method further includes exercising supervisory control over at least the driver inputs and the control signal to the one or more actuators by actively adjusting constraints on the control signal to each of the one or more actuators based on the status of the body, the status of the axles, and the status of each wheel of the motor vehicle. Actively adjusting constraints on the control signal alters boundaries of control actions in response to the one or more driver inputs such that the control signals to the one or more actuators are within boundaries of possible actuator outputs.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
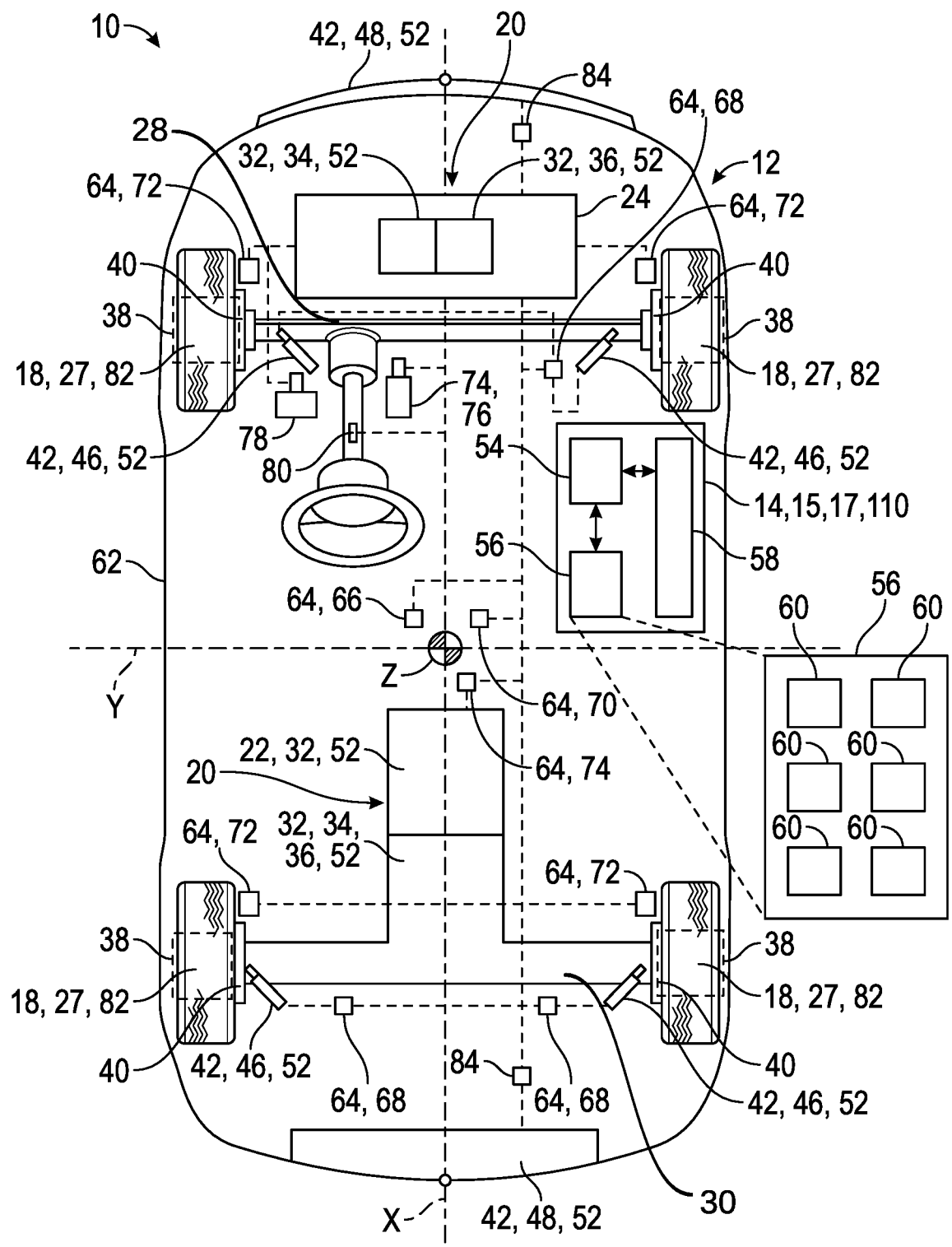
FIG. 1 is a schematic diagram of a motor vehicle having a system for supervisory control for eAWD and eLSD in a motor vehicle according to an aspect of the present disclosure.

Referring to FIG. 1, a system 10 for supervisory control of electronically-controlled or electric all-wheel drive (eAWD) and electronically controlled or electric limited slip differentials (eLSDs) in a motor vehicle 12 is shown. The system 10 includes the motor vehicle 12 and one or more controllers 14. The motor vehicle 12 is shown as a car, but it should be appreciated that the motor vehicle 12 may be a van, bus, tractor-trailer, semi, Sport-Utility Vehicle (SUV), all-terrain vehicle (ATV), truck, tricycle, motorcycle, airplane, amphibious vehicle, or any other such vehicle which makes contact with the ground without departing from the scope or intent of the present disclosure. The motor vehicle 12 includes one or more wheels having tires 18 and a drivetrain 20. The drivetrain may include a variety of components such as internal combustion engines (ICE) 22 and/or electric motors 24, and transmissions 26 capable of transmitting motive power developed by the ICEs 22 and/or electric motors 24 to the wheels 27, and ultimately to the tires 18 affixed thereto. In one example, the motor vehicle 12 may include an ICE 22 acting on a rear axle 28 of the motor vehicle 12 as well as one or more electric motors 24 acting on a front axle 30 of the motor vehicle 12. It should be appreciated, however, that the motor vehicle 12 may use one or more ICEs 22, and/or one or more electric motors 24 disposed in other configurations without departing from the scope or intent of the present disclosure. For example, the motor vehicle 12 may have an ICE 22 acting only on the front axle 30, while one or more electric motors 24 acts solely on the rear axle 28. In further examples, the ICE 22 may act on both front and rear axles 30, 28, and an electric motor may act on both front and rear axles 30, 28.

In several aspects, the drivetrain 20 includes one or more in-plane actuators 32. In-plane actuators 32 may include all-wheel drive (AWD) systems including electronically-controlled or electric AWD (eAWD) 34 systems as well as limited slip differentials (LSDs) including electronically-controlled or electric LSD (eLSD) 36 systems. In-plane actuators 32 including eAWD 34 and eLSD 36 systems can generate and/or modify force generation in X and/or Y directions at a tire 18 to road surface contact patch 38 within a certain predetermined capacity. An eAWD 34 system may transfer torque from front to rear of a motor vehicle 12 and/or from side-to-side of the motor vehicle 12. Likewise, an eLSD 36 system may transfer torque from side-to-side of the motor vehicle 12. In some examples, the eAWD 34 and/or eLSD 36 may directly alter or manage torque delivery from the ICE 22 and/or electric motors 24 and/or the eAWD 34 and eLSD 36 may act on a braking system 40 to adjust a quantity of torque delivered to each of the tires 18 of the motor vehicle 12.

In further examples, the motor vehicle 12 may include a means of altering a normal force on each of the tires 18 of the motor vehicle 12 via one or more out-of-plane actuators 42 such as active aerodynamic actuators 44 and/or active suspension actuators 46. The active aerodynamic actuators 44 may actively or passively alter an aerodynamic profile of the motor vehicle via one or more active aerodynamic elements 48 such as wings, spoilers, fans or other suction devices, actively-managed Venturi tunnels, and the like. The active suspension actuators 46 such as active dampers 50 or the like. In several aspects, the active dampers 50 may be magnetorheological dampers or other such electrically, hydraulically, or pneumatically-adjustable dampers without departing from the scope or intent of the present disclosure. For the sake of simplicity in the description that follows, ICEs 22, electric motors 24, eAWD 34, eLSD 36, the braking system 40, active aerodynamic elements 48, active dampers 46, and the like will be referred to more broadly as actuators 52.

The terms "forward", "rear", "inner", "inwardly", "outer", "outwardly", "above", and "below" are terms used relative to the orientation of the motor vehicle 12 as shown in the drawings of the present application. Thus, "forward" refers to a direction toward a front of a motor vehicle 12, "rearward" refers to a direction toward a rear of a motor vehicle 12. "Left" refers to a direction towards a left-hand side of the motor vehicle 12 relative to the front of the motor vehicle 12. Similarly, "right" refers to a direction towards a right-hand side of the motor vehicle 12 relative to the front of the motor vehicle 12. "Inner" and "inwardly" refers to a direction towards the interior of a motor vehicle 12, and "outer" and "outwardly" refers to a direction towards the exterior of a motor vehicle 12, "below" refers to a direction towards the bottom of the motor vehicle 12, and "above" refers to a direction towards a top of the motor vehicle 12. Further, the terms "top", "overtop", "bottom", "side" and "above" are terms used relative to the orientation of the actuators 52, and the motor vehicle 12 more broadly shown in the drawings of the present application. Thus, while the orientation of actuators 52, or motor vehicle 12 may change with respect to a given use, these terms are intended to still apply relative to the orientation of the components of the system 10 and motor vehicle 12 components shown in the drawings.

The controllers 14 are non-generalized, electronic control devices having a preprogrammed digital computer or processor 54, non-transitory computer readable medium or memory 56 used to store data such as control logic, software applications, instructions, computer code, data, lookup tables, etc., and input/output (I/O) ports 58. Computer readable medium or memory 56 includes any type of medium capable of being accessed by a computer, such as read only memory (ROM), random access memory (RAM), a hard disk drive, a compact disc (CD), a digital video disc (DVD), or any other type of memory. A "non-transitory" computer readable memory 56 excludes wired, wireless, optical, or other communication links that transport transitory electrical or other signals. A non-transitory computer readable memory 56 includes media where data can be permanently stored and media where data can be stored and later overwritten, such as a rewritable optical disc or an erasable memory device. Computer code includes any type of program code, including source code, object code, and executable code. The processor 54 is configured to execute the code or instructions. The motor vehicle 12 may have controllers 14 including an engine control module, a transmission control module, a body control module 15, an axle monitoring module 17, a dedicated Wi-Fi controller, an infotainment control module, or the like. The I/O ports 58 may be configured to communicate via wired communications, wirelessly via Wi-Fi protocols under IEEE 802.11x, or the like without departing from the scope or intent of the present disclosure.

The controller 14 further includes one or more applications 60. An application 60 is a software program configured to perform a specific function or set of functions. The application 60 may include one or more computer programs, software components, sets of instructions, procedures, functions, objects, classes, instances, related data, or a portion thereof adapted for implementation in a suitable computer readable program code. The applications 60 may be stored within the memory 56 or in additional or separate memory. Examples of the applications 60 include audio or video streaming services, games, browsers, social media, etc. In other examples, the applications 60 are used to manage body control system functions, suspension control system functions, or the like in an exemplary motor vehicle 12.

Figure 2:
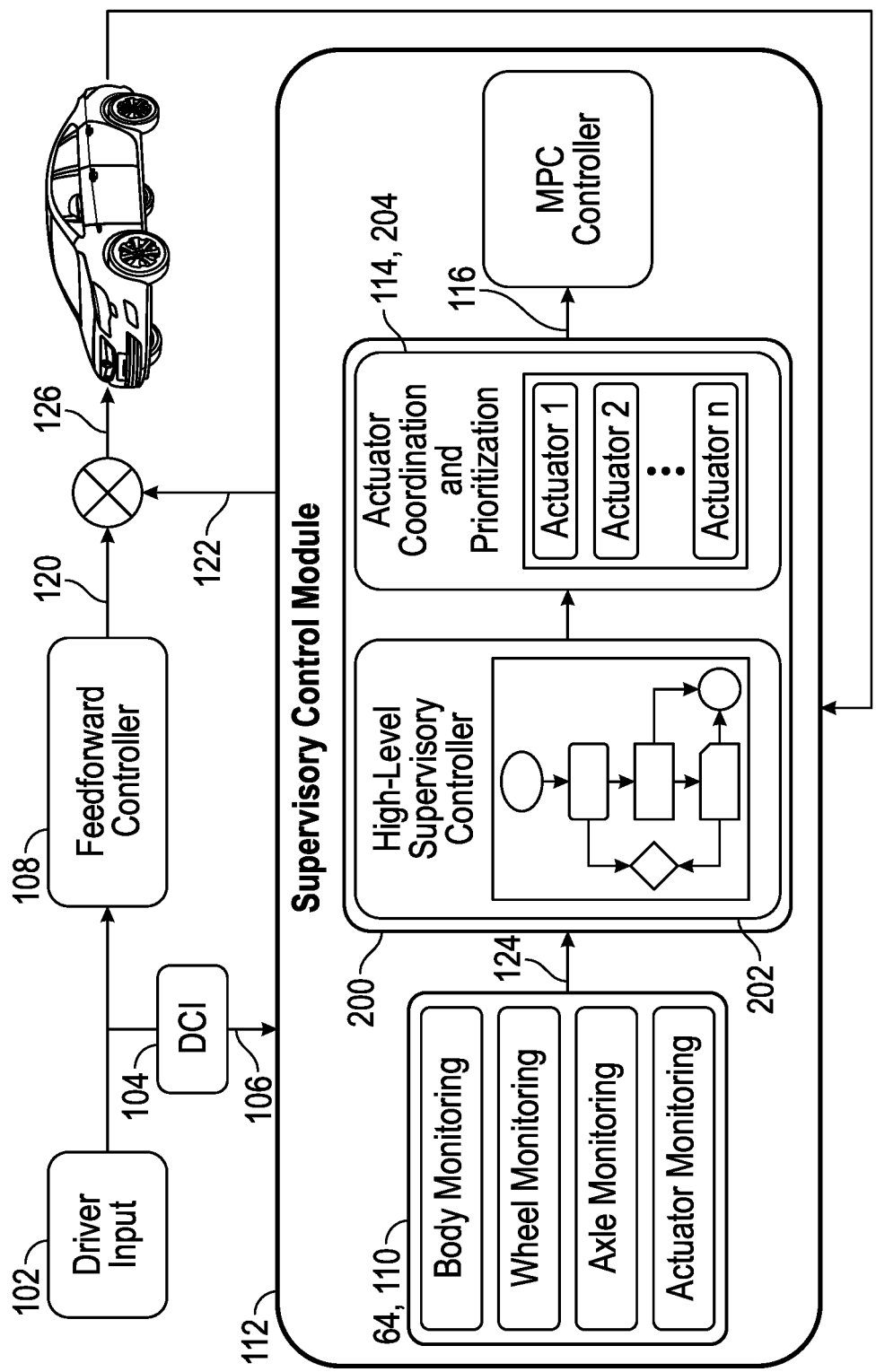
FIG. 2 is a partial functional block diagram of a portion of the system for supervisory control for eAWD and eLSD of FIG. 1 according to an aspect of the present disclosure.

Referring now to FIG. 2 and with continuing reference to FIG. 1, the system 10 utilizes one or more applications 60, stored in memory 56, for managing chassis and driveline actuators 52 of the motor vehicle 12. In several aspects, the applications 60 include computer control code portions that coordinate actuators 52 to redistribute tire 18 forces in axle and/or wheel 27 level, and/or to adjust tire 18 capacity to allow increased force generation at the tire 18/road surface contact patch 38. The computer control code portions operate using a physics-based technique that models each actuator's 52 functionality as well as the actuator's 52 impact on motor vehicle motion 12 through body 62 and wheel 27 dynamics, as well as through combined tire 18 slip models. The combined tire 18 slip model computes normalized longitudinal and lateral forces in tire 18/road surface contact patch 38 due to tire 18 deformation and characteristics. Subsequently, based on available vertical force, tire 18 forces are calculated in longitudinal and lateral directions, and interconnected to wheel 27 and body 62 dynamics to comprehend the impact of the adjusted forces on motor vehicle 12 dynamics.

More specifically, at block 100, the system 10 receives a driver input 102 to a driver control interpreter (DCI) 104. The DCI 104 reads a variety of driver inputs such as steering input, throttle input, braking input, or the like, and interprets the driver inputs before generating a desired dynamics signal 106 in the form of an actuator output. In several aspects, the DCI 104 determines boundaries for optimization and optimal coordination of actuators 52. In complex driving scenarios at or near the limits of tire 18 adhesion, the driver's inputs may exceed predefined actuator 52 capacities, tire 18 capacities, and the like. Accordingly, the system 10 utilizes a constrained optimization to reallocate sufficient capacity to X and Y directions in real-time and to redistribute tire 18 forces within the functionality and hardware limitations of each of the actuators 52. Out-of-plane actuators 42 can modify normal forces and alter force generation in X and/or Y directions at a tire 18 adhesion limit. The constrained optimization examines whether the current tire 18 capacity is sufficient with actuator 52 functionality and hardware limitations to redistribute tire 18 forces to achieve desired motor vehicle 12 motion using eAWD 34 and/or eLSD 36, or where tire 18 capacity must be increased if increased traction or lateral grip is requested by a driver of the motor vehicle 12. The constrained optimization is solved in a real-time fashion to optimally harmonize control commands from different actuators 52 so that motor vehicle 12 performance capabilities are maximized and so that control interventions are minimized. That is, the motor vehicle 12 performance capabilities are increased from a first level to a second level greater than the first level so that control interventions, such as: a traction control system (TCS) input, a stability control system input, an antilock braking system (ABS) input, or the like are reduced or substantially eliminated.

The system 10 includes several control devices, one or more of which may be integrated into a single controller 14, or may be integrated into distinct, separate controllers 14 in electronic communication with one another. The controllers 14 include a feed-forward controller 108 which commands the actuators 52 to achieve certain transient response characteristics, provide optimal reference control actions, and linearize control responses around an operation point. More specifically, the feed-forward controller 108 provides eLSD 36 preemptive control signals, and eAWD 34 preemptive control signals. Preemptive control signals, adjust actuator 52 outputs to comport with control signal estimates from a sensor/estimation module 110.

The sensor/estimation module 110 provides information to the optimization-based feed-forward controller 108 and feedback controller 112. In several aspects, the sensor/ estimation module 110 generates estimations 116 for each of the various active chassis and dynamics systems equipped to the motor vehicle 12. In a particular example, the sensor/ estimation module 110 includes an eLSD 36 model estimation, an eAWD 34 model estimation, and vehicle dynamics estimations 116. Likewise, the eLSD 36 model estimation includes clutch torque estimations and maximum clutch torque capacity estimations. The eAWD 34 model estimation produces maximum electric motor 24 torque estimations. Finally, the vehicle dynamics estimations 116 include vehicle states, road surface information, tire 18 force calculations, and road angles.

A dynamic constraint calculator 114 applies actual physical limitations, and tire 18 and road grip limitations to signals from the sensor/estimation module 110.

Finally, the feedback controller 112 operates to achieve maximum feasible performance, stability, handling, maneuverability, steerability of the motor vehicle 12 in utilizing in-plane and out-of-plane actuators 32,42. The feedback controller 112 receives a desired motor vehicle 12 dynamics signal 106 from the DCI 104, a reference control action 120 from the feed-forward controller 108, control action constraints 122 from the dynamic constraint calculator 114, and measurements 124 from the various sensors 64 equipped to the motor vehicle 12. The feedback controller 112 then integrates the desired dynamics signal 106, reference control action 120, control action constraints 122, and measurements 124 into a model which accounts for body 62 and wheel 27 dynamics and in-plane and out-of-plane actuators 32,42. The feedback controller 112 models electric motor 24 torque, eLSD 36 outputs, eAWD 34 outputs, and combined tire 18 slip data as well as front-to-rear and/or side-to-side interactions of various actuators 52 of the motor vehicle.

In addition, a model predictive control (MPC) approach is used in the feedback controller 112. The feedback controller 112 receives a variety of motor vehicle 12 state variables from sensors 64 equipped to the motor vehicle 12. The sensors 64 may measure and record a wide variety of motor vehicle 12 data. In several examples, the sensors 64 may include inertial measurement units (IMUs) 66, suspension control units such as Semi Active Damping Suspension (SADS) 68, global positioning system (GPS) sensors 70, wheel speed sensors 72, throttle position sensors 74, accelerator pedal position sensors 76, brake pedal position sensors 78, steering position sensors 80, tire pressure monitoring sensors 82, aerodynamic element position sensors 84, and the like. The IMUs 66 can measure movement, acceleration, and the like in several degrees of freedom. In a specific example, the IMUs 66 may measure position, movement, acceleration, etc. in at least three degrees of freedom. Likewise, the SADS 68 sensors may be IMUs 66 capable of measuring in three or more degrees of freedom. In some examples, the SADS 68 may be suspension hub accelerometers, or the like. Accordingly, the motor vehicle 12 state variables may include any of a wide variety of data including but not limited to: wheel 27 speed data, SADS and IMU data including attitude, acceleration and the like.

The MPC control logic portion or algorithm in the feedback controller 112 produces state predictions based on initial state variables measured or estimated by the sensors 64 on the motor vehicle 12. Additional estimations 116 may also be made in order to model the impact of different factors on state variables. In cases of nonlinearity in the prediction model, a linearized model is provided for specific operational parameters using motor vehicle 12 state variable measurements and/or estimations 116 and reference control actions 120. In order to come up with feasible control commands for the various actuators 52, actuator 52 capacity and tire 18 capacity limits should be taken into consideration in calculations. That is, a given actuator 52 in the motor vehicle 12 may have a limited range of outputs including but not limited to a limited range of motion, limitations on velocity and/or acceleration, actuator 52 torque, and the like. Similarly, tire 18 capacity may be limited by tread depth, tire 18 wear, tire 18 pressure, tire 18 compound, tire 18 temperature, a coefficient of friction of a road surface at the contact patch 38, and the like. Accordingly, the feedback control portion of the MPC in the feedback controller 112 includes an offline control logic portion that contains a formulation of the state variables of the motor vehicle 12 as well as a control objective design, as well as an online optimization control logic portion.

A prediction model control logic portion forecasts the evolution of state variables (X) and evaluates a connection between a control action sequence (U) and outputs (Y) over a finite prediction horizon. The prediction model control logic portion includes motor vehicle core dynamics such as a body 62 dynamics model including longitudinal, lateral, yaw, bounce, and pitch characteristics of the motor vehicle 12. Likewise, the prediction model control logic includes a wheel 27 dynamics model that including angular speed and relative speed data, as well as longitudinal slip and slip ratio characteristics of each wheel 27. The prediction model control logic also includes, for example, a tire 18 mechanics model that contains a combined slip tire model for each tire 18 of the motor vehicle 12. Finally, the prediction model control logic includes an actuator 52 model that contains actuator 52 dynamics, constraints, and functionality.

The system 10 further includes a supervisory control module 200. The supervisory control module 200 is a controller 14 containing components substantially similar to those described hereinabove. However, the control logic portions of the supervisory control module 200 operate to enhance overall system 10 performance and reliability in complex driving situations by adjust control commands in real-time according to data from the motor vehicle 12 sensors 64 and actuators 52. Broadly, the supervisory control module 200 performs one or more checks to determine the accuracy of calculated control actions and modifies any undesired control actions that may be requested. The supervisory control module 200 operates in a real-time constrained manner to manage multiple actuators 52 of the motor vehicle 12 to solve multiple objective vehicle control problems. In several aspects, the supervisory control module 200 coordinates and prioritizes actuators 52 to achieve desired motor vehicle 12 dynamics within tire 18 capacity actuator 52 limitations, and the like. The supervisory control module 200 performs rationality checks to evaluate driver input 102 commanded control actions and to assess potential ability to maintain motor vehicle 12 stability given the driver commanded control actions. If the control actions calculated by the supervisory control module 200 exceed actuator 52 limitations, tire 18 capacity, or the like, the supervisory control module 126 adjusts optimization constraints so as to disallow such control inputs. The supervisory control module 200 brings desired effects of each control action into the control system, especially for actuators 52 with complex, nonlinear mathematical models which may not have a direct effect on the state of the motor vehicle 12. Additionally, the supervisory control module 200 updates priorities of control actuations and control objectives in real time by monitoring body, wheel 27, and axle 28,30 status to ensure appropriate motor vehicle 12 performance. In several aspects, the supervisory control module 200 acts as a filter between The supervisory control module 200 includes at least two primary control logic portions: a high level supervisory control portion 202, and an actuator coordination and prioritization portion 204. The supervisory control module 200 performs real-time monitoring of wheel 27, axle 28, 30, and body 62 behavior. For given situational behavior of each wheel 27, axle 28, 30, and body 62 of the motor vehicle 12, the supervisory control module 200 defines an envelope for control actions. More specifically, the supervisory control module 200 begins real-time monitoring by checking a status of the body 62 of the motor vehicle 12. Given that body 62 stability has highest priority, information of the body control module 15 is first to be considered in the supervisory control module 200 logic. The body control module 15 detects body 62 status by comparing measured yaw rate and sideslip angles with stability margins defined as:

$$\beta_{min}^{max} = \pm \operatorname{atan}\left(\frac{3\xi\mu F_z}{C_{ar}}\right) + \frac{l_r r}{v_x}$$

where r is the yaw rate, β is the sideslip angle, $v_x$ is the longitudinal speed, $l_r$ is the distance from the center of gravity to the rear axle 30, and $l_f$ is the distance from the center of gravity to the front axle 28, l is the distance between front and rear axles 28, 30, m is the total mass of the motor vehicle 12, μ is the coefficient of friction of the road, and $C_\alpha$ is the tire 18 cornering stiffness. If the body 62 status is stable, that is, if the yaw rate, sideslip angle, and longitudinal speed are within predefined stability margins, the body control module 15 sends a green flag (or other such positive indicia) to the supervisory control module 200. However, if the supervisory control module 200 receives a red flag (or other such negative indicia) from the body control module 15, the supervisory control module 200 interprets the red flag as an indication that the motor vehicle 12 has crossed the predefined stability margins.

Once the supervisory control module 200 has received a body control module 15 signal, the supervisory control module 200 checks an axle 28, 30 stability status. More specifically, the supervisory control module 200 polls the axle monitoring module 17 to determine whether each axle 28, 30 has been laterally saturated. The front and rear axles 28, 30 are defined as being saturated when tires' 18 slip angles are more than tires' saturation limits as defined by:

$$\alpha_{lim} = \operatorname{atan}\left(\frac{3\xi\mu F_z}{C_{ar}}\right)$$

where $F_z$ is tire 18 normal load, $C_\alpha$ is tire 18 stiffness, μ is the coefficient of friction of the road, and κ is the tire slip ratio. If the axle 28, 30 has been laterally saturated, the supervisory control module 200 understands that axle 28, 30 torque should be constrained and not increased further from a current axle 28, 30 torque level. That is, when the axle 28, 30 is laterally saturated, the motor vehicle 12 is likely to be near, at, or even above the adhesion limits of the tires 18. By contrast, when the axle monitoring module 17 reports that the axles 28, 30 of the motor vehicle 12 are not laterally saturated, the supervisory control module 200 may allow the execution of control logic that increases axle 28, 30 torque.

Having now checked both the state of the body 62 via the body control module 15 and the status of each axle 28, 30 via the axle monitoring module 17, the supervisory control module 200 determines a status of each of the wheels 27 of the motor vehicle 12. More specifically, the supervisory control module 200 polls the sensor/estimation module 110 or wheel stability module 110' to determine if estimated slip ratios of each tire 18 of the motor vehicle 12 indicate that the tires 18 are passing or have exceeded tire 18 stability margins. That is, the wheel stability module 110' receives estimated values of tires' slip ratios and compares them with tires' 18 stability margins $\kappa_{max}$. If the tires 18 have exceeded the tire 18 stability margins, the supervisory control module 200 sets a red flag (or other such negative indicia), while if the tires 18 are still within the tire 18 stability margins, the supervisory control module 200 sets a green flag (or other such positive indicia).

It should be appreciated that in the foregoing, the concept of a "red flag" indicates that a stability limit for one or more components of the motor vehicle 12 have been exceeded, while a "green flag" indicates that the stability limit for one or more components of the motor vehicle 12 have not been exceeded and, moreover, that there is additional headroom for control. In an example, when a red flag has been set, additional torque may not be applied to the wheels 27 or axles 28, 30 of the motor vehicle 12, while when a green flag has been set, some additional torque may be applied to the wheels 27 and/or axles 28, 30 of the motor vehicle up to the predefined stability limits of the motor vehicle 12.

Based on the available actuators 52, the stability information, and the objectives of the control system 10, the supervisory control module 200 determines whether any adjustment is required on the control action constraints. At each time step, optimization constraints are being updated by a set of logic-based rules. The supervisory logics change the boundaries of control action variations $\Delta u_{min}$ and $\Delta u_{max}$. If the control action must stop increasing, then: $\Delta u_{min} \leq \Delta u \leq \Delta u_{max} \Rightarrow \Delta u_{min} \leq \Delta u \leq 0$. Whereas, if the control action must stop decreasing, then: $\Delta u_{min} \leq \Delta u \leq \Delta u_{max} \Rightarrow 0 \leq \Delta u \leq \Delta u_{max}$. The state-space form of the prediction model of the supervisory control module 200 can be depicted as:

$$\begin{cases} \dot{x} = Ax + Bu + d \\ y = Cx \end{cases}$$

with: control variables: $u=[T_f\ T_C]^T$; control outputs: $y=[\beta\ r]^T$; desired outputs: $y_{des}=[\beta_{des}\ r_{des}]^T$; desired yaw rate: $r_{des}=\text{sign}(r_{ss})\ \min(\|r_{ss}\|, \|r_{max}\|)$, desired sideslip angle: $\beta_{des}=\text{sign}(\beta_{ss})\min(|\beta_{ss}|, |\beta_{max}|)$; steady-state yaw rate:

$$r_{ss} = \frac{v_x}{l + k_{us}v_x^2}\delta;$$

and steady-state sideslip angle:

$$\beta_{ss} = \frac{l_r - ml_f v_x^2 / 2lC_{\alpha r}}{l + k_{us}v_x^2}\delta.$$

However, it should be appreciated that actuator 52 dynamics should be taken into consideration in the prediction model, as actuators 52 typically include a time delay r during actuation. Accordingly, actuator dynamics can be modeled by the following:

$$\begin{bmatrix} \dot{T}_{f,a} \\ \dot{T}_{C,a} \end{bmatrix} = \begin{bmatrix} -\frac{1}{\tau_z} & 0 \\ 0 & -\frac{1}{\tau_z} \end{bmatrix} \begin{bmatrix} T_{f,a} \\ T_{C,a} \end{bmatrix} + \begin{bmatrix} \frac{1}{\tau_z} & 0 \\ 0 & \frac{1}{\tau_Z} \end{bmatrix} \begin{bmatrix} T_{f,r} \\ T_{C,r} \end{bmatrix}; \text{ and } \dot{x}_u = A_u x_u + B_u u_r.$$

The actuator dynamics may then be integrated into the prediction model through the following equations:

$$\begin{bmatrix} \dot{x} \\ \dot{x}_u \end{bmatrix} = \begin{bmatrix} A & B \\ 0 & A_u \end{bmatrix}\begin{bmatrix} x \\ \dot{x}_u \end{bmatrix} + \begin{bmatrix} 0 \\ B_u \end{bmatrix} u_r + \begin{bmatrix} d \\ 0 \end{bmatrix}, \text{ and } Y = [C\ 0]\begin{bmatrix} x \\ x_u \end{bmatrix}.$$

Setting $$\begin{bmatrix} A & B \\ 0 & A_u \end{bmatrix} \text{ to be } \overline{A}, \begin{bmatrix} 0 \\ B_u \end{bmatrix}$$

to be $\overline{B}$, $[C\ 0]$ to be $\overline{C}$, and $$\begin{bmatrix} d \\ 0 \end{bmatrix}$$

to be $\overline{d}$, the above actuator dynamics model equation may be expressed in both continuous time and discrete time forms. In continuous time, the equation may be written as: $\dot{X}=\overline{A}X+\overline{B}u_r+\overline{d}$ and $Y=\overline{C}X$ while the discrete time version of the equation may be written as: $X_{k+1}=\overline{A}_d X_k+\overline{B}_d u_{r,k}+\overline{d}_d$ and $Y_k=\overline{C}_d X_k$. In several aspects, sampling time $T_s$ for a typical actuator 52 may be approximately 12.5 milliseconds, however it should be appreciated that sampling times $T_s$ for different actuators 52 may vary substantially without departing from the scope or intent of the present disclosure. The supervisory control module 200 utilizes control logic in the feedback controller 112 to define $\Delta u_{in}$ as a new state to the integrated state-space model:

$$\begin{cases} X_{u,k+1} = X_{u,k} + \Delta u_{in,k} \\ \Delta u_{in,k} = u_{in,k} - u_{in,k-1} \end{cases}.$$

Integrating input increments $\Delta u_r$ into the state-space model yields:

$$\begin{bmatrix} X_{k+1} \\ X_{u,k+1} \end{bmatrix} = \begin{bmatrix} \overline{A}_d & \overline{B}_d \\ 0 & I \end{bmatrix}\begin{bmatrix} X_k \\ X_{u,k} \end{bmatrix} + \begin{bmatrix} \overline{B}_d \\ 0 \end{bmatrix}\Delta u_r + \begin{bmatrix} \overline{d}_d \\ 0 \end{bmatrix}, \text{ and } Y = [\overline{C}_d\ 0]\begin{bmatrix} X_k \\ X_{u,k} \end{bmatrix}.$$

Constraints on rate of change of control inputs may be expressed by $\Delta u_r^{min} \leq \Delta u_r \leq \Delta u_r^{max}$, and the constraints on the control inputs themselves may be expressed by $u_r^{min} \leq u_r \leq u_r^{max}$. Finally, a function is applied to decide which control actions are appropriate as outputs of the feedback controller 112. The cost function may be expressed as:

$$J(x(t), U) = \underbrace{\sum_{k=1}^{p}\|y_{t+k,t} - y_{t+k,y}^{Ref}\|_{W_1}^2}_{\text{tracking error term}} + \underbrace{\sum_{k=0}^{p-1}\|u_{t+k,t} - u_{t+k,t}^{Ref}\|_{W_2}^2}_{\text{control action error}} + \underbrace{\|\Delta u_{t+k,t} - \Delta u_{t+k,t}^{Ref}\|_{W_3}^2}_{\text{control action variation error}}$$

$$\text{s.t. } x_{t+k+1,t} = Ax_{t+k,t} + Bu_{t+k,t} + d, k = 0, \ldots, N-1$$

$$x_0 = x(t)$$

$$u_{min} \leq u_{t+k} \leq u_{max}, k = 0, \ldots, N-1$$

$$Hx_{t+k+1,t} \leq G_{t+k,t} + s_{t+k,t}, k = 0, \ldots, N-1$$

where $y_{t+k,t}$ and $y_{t+k,t}^{Ref}$ denote predicted and reference outputs in control/prediction, respectively. $u_{t+k,t}$ and $u_{t+k,t}^{Ref}$ denote control actions in control/prediction horizon, and $\Delta u_{t+k,t}$ and $\Delta u_{t+k,t}^{Ref}$ denote control action variation and its reference in control/prediction horizon, respectively.

Utilizing the above series of equations, the MPC control logic portion or algorithm in the feedback controller 112 calculates optimal eAWD 34 and eLSD 36 actions to improve yaw tracking performance and maintain tire 18 slip angle within stable performance regions. In several aspects, the MPC control logic portion or algorithm in the feedback controller 112 sends torque to the front axle 28 to induce an understeering yaw moment and improve yaw tracking responses in response to a flick maneuver in which the motor vehicle 12 driver induces oversteer by making a large and rapid steering movement and contemporaneously making a large and aggressive torque request. Since the MPC control logic portion or algorithm aims only at controlling the motor vehicle 12 body dynamics and the supervisory control module 200 has not yet been engaged in managing the maneuver, all the torque is transferred to the front axle 28 and the front wheels 27 become saturated thereby resulting in wheel flare WF with a large slip ratio, for example slip=0.8.

In response to the steering input, torque request, torque transfer, and wheel flare WF, the supervisory control module 200 detects that the front wheels 27 are saturated and stops further increasing torque on the front axle 28. The torque reduction decreases wheel flare WF on the front wheels 27. Thus the supervisory control module 200 mitigates wheel flare WF at the front wheels 27. The controller 14 subsequently sends torque to the rear axle 30 to generate an oversteering yaw moment, but the supervisory control module 200 stops further increases in rear axle 30 torque when the rear wheels 27 are saturated. The body 62 of the motor vehicle 12 is stable at this stage, however the yaw rate response shows that the vehicle requires an understeering yaw moment. Since the front axle 28 is saturated, the supervisory control module 200 disallows increases in torque on the front axle 28. Therefore, the right rear wheel slip passes the predefined threshold for wheel flare (slip=0.12, for example). The supervisory control module 200 steps in and gives priority to wheel 27 control and activates the eLSD 36 even though the eLSD may generate an oversteering yaw moment in a direction opposite to the direction of the yaw moment needed to achieve a yaw tracking objective.

Figure 3A:
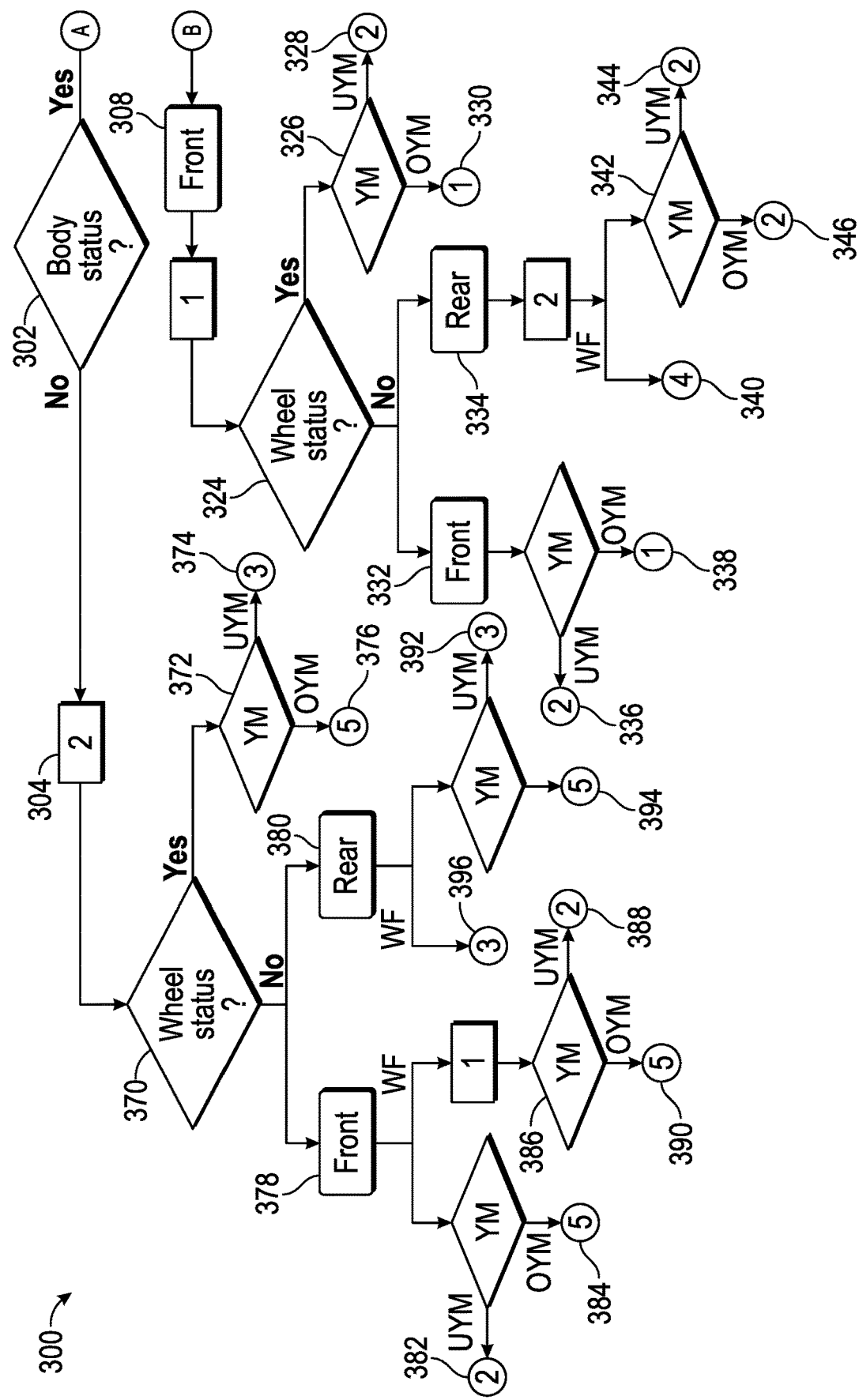
FIG. 3A is a decision tree depicting a method for supervisory control for eAWD and eLSD according to an aspect of the present disclosure.
Figure 3A:
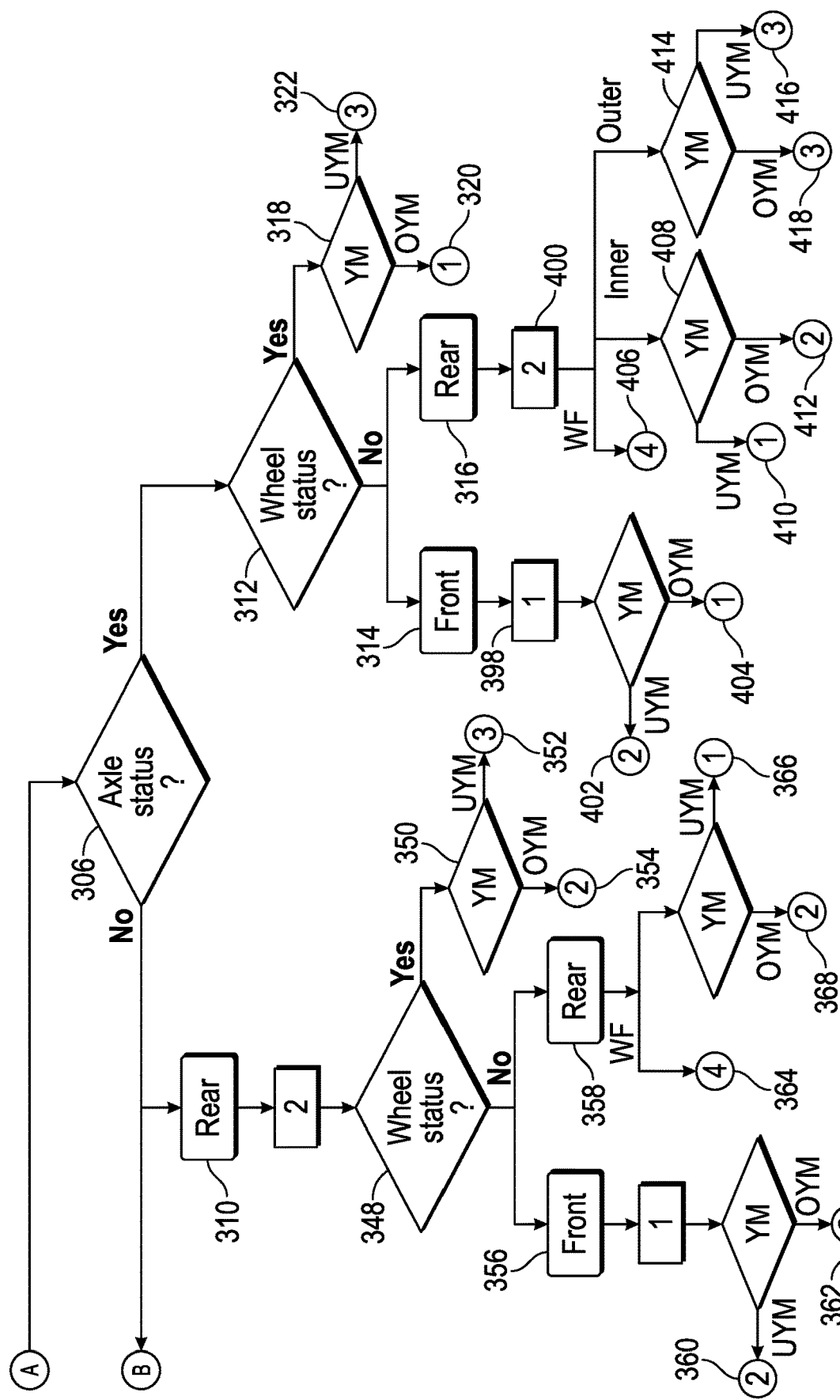

Turning now to FIG. 3A, and with continuing reference to FIGS. 1-2, a decision tree depicting an embodiment a method 300 of use for the supervisory control module 200 for an eLSD 36 and eAWD 34 equipped motor vehicle 12 is shown. In the example of FIG. 3A, the method begins at block 302, where the current status of the motor vehicle 12 body 62 is ascertained. The body 62 status is determined by the suite of sensors 64 and actuators 52 equipped to the motor vehicle 12 via the body control module 15. When at block 302, the body 62 status is reported as exceeding predetermined stability parameters (i.e. a red flag is set), the method 300 proceeds to block 304 where a torque transfer to the rear axle 30 of the motor vehicle 12 is halted. Defaulting to a reduction in torque at the rear axle 30 provides several benefits in terms of increasing predictability and controllability of the motor vehicle 12 in extreme driving situations where the tires 18 of the motor vehicle 12 are approaching, at, or above grip thresholds.

By contrast, when at block 302, the body status is reported as being within predetermined stability parameters (i.e. a green flag is set), the method 300 proceeds to block 306 where a status of the axles 28, 30 is determined. More specifically, at block 306, the axle monitoring module 17 determines from the sensors 64 and actuators 52 of the motor vehicle 12, whether the axles 28, 30 are both within predefined axle 28, 30 stability parameters. If the axles 28, 30 of the motor vehicle 12 are in a state that exceeds the predefined axle 28, 30 stability parameters, then the method 300 proceeds to blocks 308 and 310 where a torque transfer to both the front and rear axles 28, 30 is halted. When at block 306 the method 300 determines that the axles 28, 30 are below the predefined stability parameters, the method 300 proceeds to block 312.

At block 312, the system 10 ascertains the stability status of each of the wheels 27 of the motor vehicle 12. More specifically, the sensor/estimation module 110 or wheel stability module 110' determines whether estimated slip ratios of each tire 18 of the motor vehicle 12 indicate that the tires 18 are within or have exceeded tire 18 stability margins. If at block 312, the tires 18 have exceeded the tire 18 stability margins, the method 300 proceeds to blocks 314 and 316, where a torque transfer to both the front and rear axles 28, 30 is halted. By contrast, when at block 312, the tires 18 are determined to still be within tire 18 stability margins, the method 300 proceeds to block 318 where a yaw moment (YM) of the motor vehicle 12 is calculated. In several aspects, the yaw moment YM of the motor vehicle 12 is situational and depends upon both: stability parameters of the motor vehicle 12 as described above, and upon driver input requests. In some examples, under performance driving conditions, the driver input request may indicate a yaw moment YM that amounts to an oversteer request as shown by the oversteer yaw moment OYM (OYM) at block 320. By contrast, under other driving conditions, the driver input request may indicate an understeer yaw moment (UYM) as shown by block 322.

Referring once more to block 306, when the torque transfer to both the front and rear axles 28, 30 is halted at blocks 308 and 310, respectively, the method 300 takes additional steps to ensure driver control is maintained. For example, once a torque transfer to the front axle 28 is halted at block 308, the method 300 proceeds to block 324 where a status of the wheels 27 is determined. When the sensor/estimation module 110 or wheel stability module 110' determines whether estimated slip ratios of each tire 18 of the motor vehicle 12 indicate that the tires 18 are within or have exceeded tire 18 stability margins at block 324, the method proceeds to block 326, where a yaw moment YM is calculated and an understeer yaw moment UYM 328 is provided via torque transfer through the eLSD 36 and/or eAWD 34 or an oversteer yaw moment OYM 330 is provided via torque transfer through the eLSD 36 and/or eAWD 34.

When the sensor/estimation module 110 or wheel stability module 110' determines that the estimated slip ratios of each tire 18 of the motor vehicle 12 indicate that the tires 18 have exceeded the tire 18 stability margins at block 324, the method proceeds to blocks 332 and 334. From block 332, a yaw moment YM is induced by activation of the eLSD 36 and/or eAWD 34 to transfer torque at the front axle 28 to create an understeer yaw moment UYM at block 336 in situations where understeer is preferable to correct the over-threshold tire 18 stability. Similarly, when the motor vehicle 12 is in a condition where an oversteer yaw moment OYM is preferable to correct the over-threshold tire 18 stability, the eLSD 36 and/or eAWD 34 are engaged in a torque transfer at the front axle 28 induce an oversteer yaw moment OYM at block 338.

From block 334, the system 10 manages torque transfer to the rear axle 30 of the motor vehicle 12. More specifically, a torque transfer to the rear axle 30 of the motor vehicle 12 is halted. At block 340, when a wheel flare (WF) is detected, the system 10 prioritizes wheel 27 control and generates a yaw moment YM at block 342 by application of a torque transfer at the rear axle to induce either an understeer yaw moment UYM at block 344 or an oversteer yaw moment OYM at block 346 via torque transfer through the eLSD 36 and/or eAWD 34 at the rear axle 30.

When the torque transfer to the rear axle 30 is halted at block 310, the method 300 proceeds to block 348 where a status of the wheels 27 is determined. When the sensor/ estimation module 110 or wheel stability module 110' determines whether estimated slip ratios of each tire 18 of the motor vehicle 12 indicate that the tires 18 are within or have exceeded tire 18 stability margins at block 348, the method proceeds to block 350, where a yaw moment YM is calculated and an understeer yaw moment UYM 352 is provided via torque transfer through the eLSD 36 and/or eAWD 34 or an oversteer yaw moment OYM 354 is provided via torque transfer through the eLSD 36 and/or eAWD 34.

When the sensor/estimation module 110 or wheel stability module 110' determines that the estimated slip ratios of each tire 18 of the motor vehicle 12 indicate that the tires 18 have exceeded the tire 18 stability margins at block 348, the method 300 proceeds to blocks 356 and 358. At block 360, a yaw moment YM is induced by activation of the eLSD 36 and/or eAWD 34 to transfer torque at the front axle 28 to create an understeer yaw moment UYM in situations where understeer is preferable to correct the over-threshold tire 18 stability. Similarly, when the motor vehicle 12 is in a condition where an oversteer yaw moment OYM is preferable to correct the over-threshold tire 18 stability, the eLSD 36 and/or eAWD 34 are engaged in a torque transfer at the front axle 28 induce an oversteer yaw moment OYM at block 362.

From block 358, the system 10 manages torque transfer to the rear axle 30 of the motor vehicle 12. More specifically, a torque transfer to the rear axle 30 of the motor vehicle 12 is halted. At block 364, when wheel flare WF is detected, the system 10 prioritizes wheel 27 control and generates a yaw moment YM by application of a torque transfer at the rear axle to induce either an understeer yaw moment UYM at block 366 or an oversteer yaw moment OYM at block 368 via torque transfer through the eLSD 36 and/or eAWD 34 at the rear axle 30.

Referring once more to block 304, once the torque transfer to the rear axle 30 of the motor vehicle 12 is halted, the method 300 proceeds to block 370 where a status of the wheels 27 is determined via the sensor/estimation module 110 or wheel stability module 110'. When the sensor/estimation module 110 or wheel stability module 110' determines that estimated slip ratios of each tire 18 of the motor vehicle 12 indicate that the tires 18 are within tire 18 stability margins, the method 300 proceeds to block 372, where a yaw moment YM is calculated and either an understeer yaw moment UYM 374 is provided via torque transfer through the eLSD 36 and/or eAWD 34 or an oversteer yaw moment OYM 376 is provided via torque transfer through the eLSD 36 and/or eAWD 34.

However, when the sensor/estimation module 110 or wheel stability module 110' determines that the estimated slip ratios of each tire 18 of the motor vehicle 12 indicate that the tires 18 have exceeded the tire 18 stability margins at block 370, the method proceeds to blocks 378 and 380. From block 378, a torque transfer is executed at the front axle 28. More specifically, at block 382, an understeer yaw moment UYM is induced by activation of the eLSD 36 and/or eAWD 34 to transfer torque at the front axle 28 in situations where understeer is preferable to correct the over-threshold tire 18 stability. Similarly, when the motor vehicle 12 is in a condition where an oversteer yaw moment OYM is preferable to correct the over-threshold tire 18 stability, the eLSD 36 and/or eAWD 34 are engaged in a torque transfer at the front axle 28 induce an oversteer yaw moment OYM at block 384.

Moreover, at block 378, the sensor/estimation module 110 or wheel stability module 110' monitors the wheels 27 for wheel flare WF as well, and when wheel flare WF is detected, a torque transfer to the front axle 28 is halted, and a yaw moment is induced at block 386. More specifically, at block 388 an understeer yaw moment UYM is induced by activation of the eLSD 36 and/or eAWD 34 to transfer torque at the front axle 28 in situations where understeer is preferable to correct the over-threshold tire 18 stability. Similarly, when the motor vehicle 12 is in a condition where an oversteer yaw moment OYM is preferable to correct the over-threshold tire 18 stability, the eLSD 36 and/or eAWD 34 are engaged in a torque transfer at the front axle 28 induce an oversteer yaw moment OYM at block 390.

At block 380 a torque transfer is executed at the rear axle 30. More specifically, at block 392, an understeer yaw moment YM is induced by activation of the eLSD 36 and/or eAWD 34 to transfer torque at the rear axle 30 in situations where understeer is preferable to correct the over-threshold tire 18 stability. Similarly, when the motor vehicle 12 is in a condition where an oversteer yaw moment OYM is preferable to correct the over-threshold tire 18 stability, the eLSD 36 and/or eAWD 34 are engaged in a torque transfer at the rear axle 30 induce an oversteer yaw moment OYM at block 394. Moreover, at block 380, the sensor/estimation module 110 or wheel stability module 110' monitors the wheels 27 for wheel flare WF as well, and when wheel flare WF is detected, a torque transfer to the front axle rear axle 30 is managed via torque transfer through the eLSD 36 and/or eAWD 34 at block 396.

Referring once more to block 312, when the sensor/estimation module 110 or wheel stability module 110' determines that the estimated slip ratios of each tire 18 of the motor vehicle 12 indicate that the tires 18 have exceeded the tire 18 stability margins, the method 300 proceeds to blocks 398 and 400. At block 398, a torque transfer to the front axle 28 is halted, and the method 300 and a yaw moment YM is induced. In some examples, the yaw moment YM is an understeer yaw moment UYM 402, which is induced by activation of the eLSD 36 and/or eAWD 34 to transfer torque at the front axle 28 in situations where understeer is preferable to correct the over-threshold tire 18 stability. Similarly, when the motor vehicle 12 is in a condition where an oversteer yaw moment OYM is preferable to correct the over-threshold tire 18 stability, the eLSD 36 and/or eAWD 34 are engaged in a torque transfer at the front axle 28 induce an oversteer yaw moment OYM at block 404.

Similarly, when the sensor/estimation module 110 or wheel stability module 110' determines that the estimated slip ratios of each tire 18 of the motor vehicle 12 have exceeded tire 18 stability margins, the system 10 halts torque transfer to the rear axle 30 of the motor vehicle 12 at block 400 as well. When the sensor/estimation module 110 or wheel stability module 110' determines that wheel flare WF is occurring, the method 300 proceeds to block 406 where the system 10 prioritizes wheel 27 control.

At block 408, the system 10 executes a torque transfer at an inside rear wheel 27 of the motor vehicle 12. When the motor vehicle 12 is turning, rather than traveling in a straight line, the inside wheels 27 are those wheels 27 proximate the inside of the turn. That is, the inside wheels 27 rotate fewer times than the outer wheels 27 as the motor vehicle 12 traverses a turn. Therefore, it should be appreciated that when the motor vehicle 12 is turning, the inside and outside wheels 27 rotate at different angular velocities when in a longitudinally and laterally unsaturated state. In some examples, at block 410, the torque transfer to the inside rear wheel 27 of the motor vehicle 12 induces an understeer yaw moment UYM activation of the eLSD 36 and/or eAWD 34 in situations where understeer is preferable to correct the over-threshold tire 18 stability. Similarly, when the motor vehicle 12 is in a condition where an oversteer yaw moment OYM is preferable to correct the over-threshold tire 18 stability, the eLSD 36 and/or eAWD 34 are engaged in a torque transfer to or from the inside rear wheel to induce an oversteer yaw moment OYM at block 412.

At block 414, the system 10 executes a torque transfer at an outside rear wheel 27 of the motor vehicle 12. When the motor vehicle 12 is turning, rather than traveling in a straight line, the outside wheels 27 are those wheels 27 proximate the outside of the turn. That is, the outside wheels 27 rotate fewer times than the inner wheels 27 as the motor vehicle 12 traverses a turn. Therefore, it should be appreciated that when the motor vehicle 12 is turning, the inside and outside wheels 27 rotate at different angular velocities when in a longitudinally and laterally unsaturated state. In some examples, at block 416, the torque transfer to the outside rear wheel 27 of the motor vehicle 12 induces an understeer yaw moment UYM activation of the eLSD 36 and/or eAWD 34 in situations where understeer is preferable to correct the over-threshold tire 18 stability. Similarly, when the motor vehicle 12 is in a condition where an oversteer yaw moment OYM is preferable to correct the over-threshold tire 18 stability, the eLSD 36 and/or eAWD 34 are engaged in a torque transfer to or from the inside rear wheel to induce an oversteer yaw moment OYM at block 418.

Figure 3B:
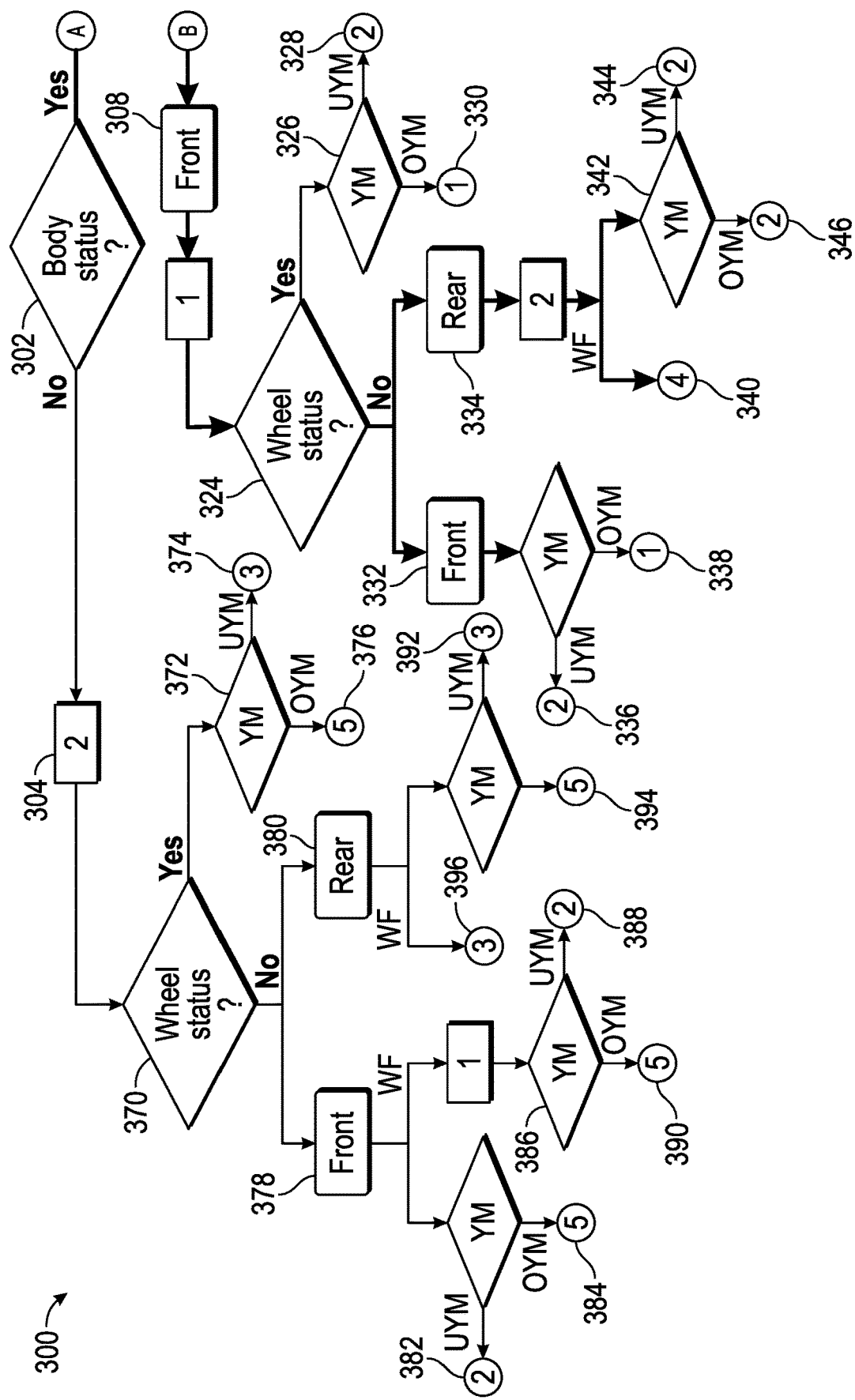
FIG. 3B depicts a first exemplary set of method steps carried out in the decision tree of FIG. 3A under a first set of driving circumstances according to an aspect of the present disclosure.
Figure 3B:
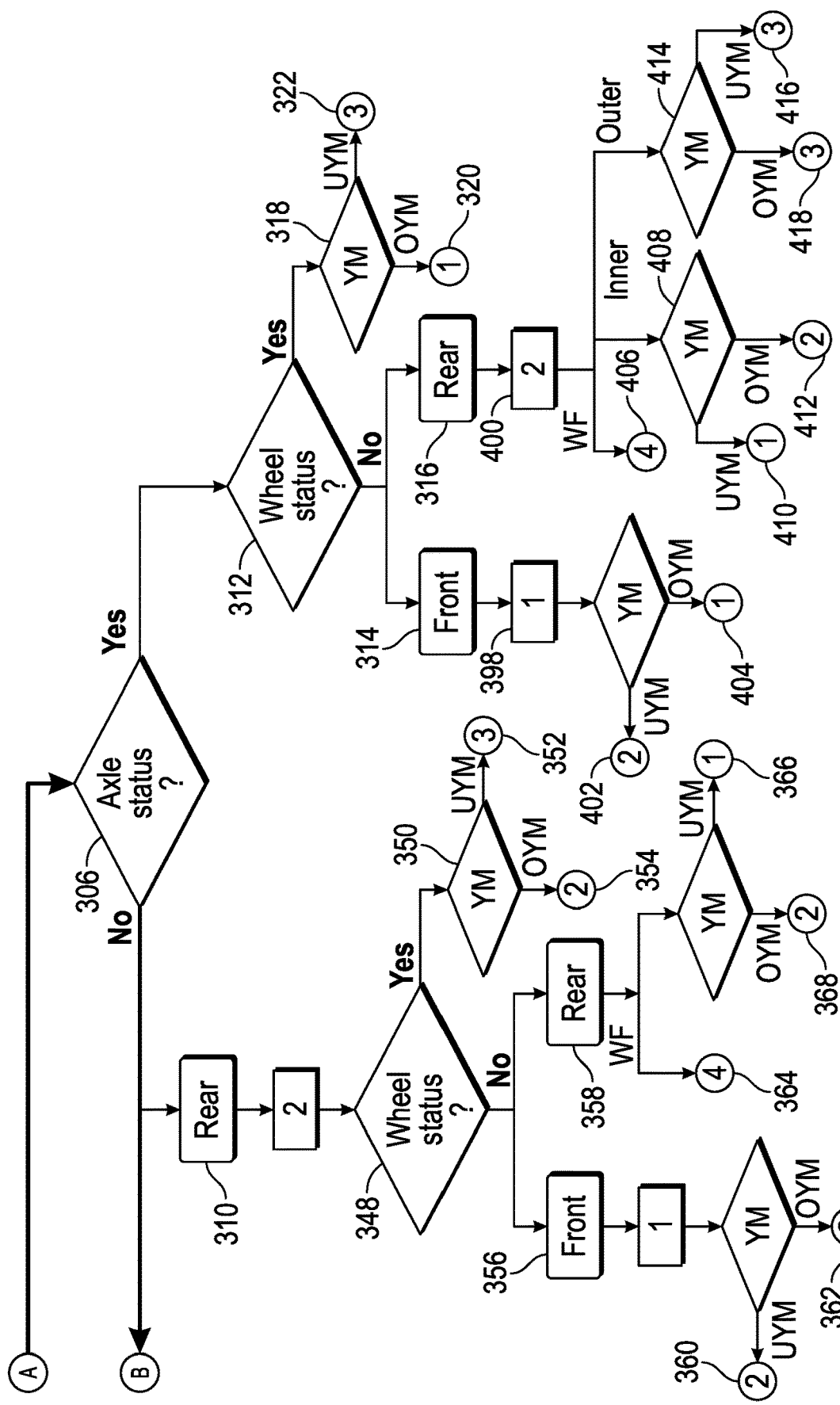
Figure 3C:
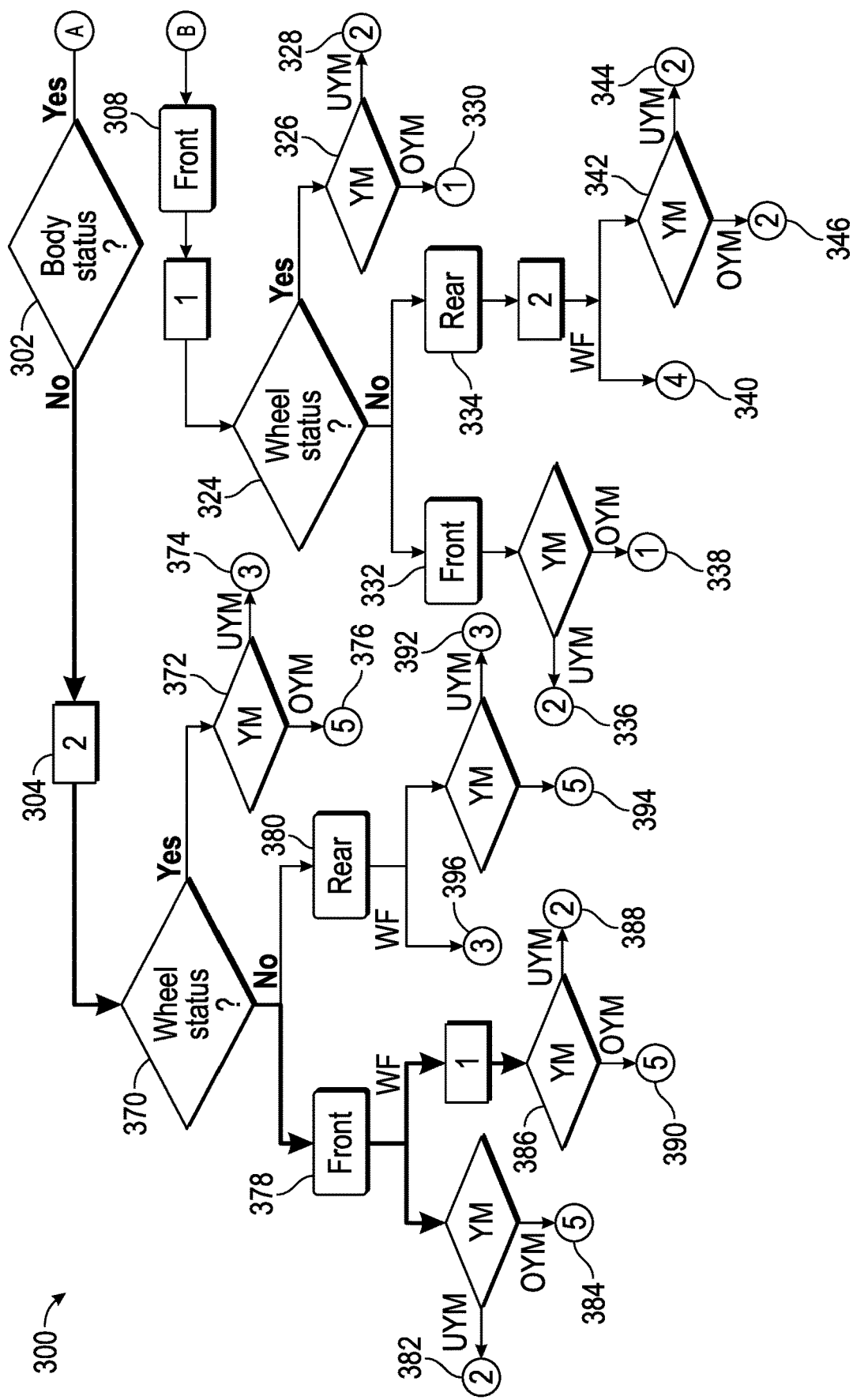
FIG. 3C depicts a second exemplary set of method steps carried out in the decision tree of FIG. 3A under a second set of driving circumstances according to an aspect of the present disclosure.
Figure 3C:
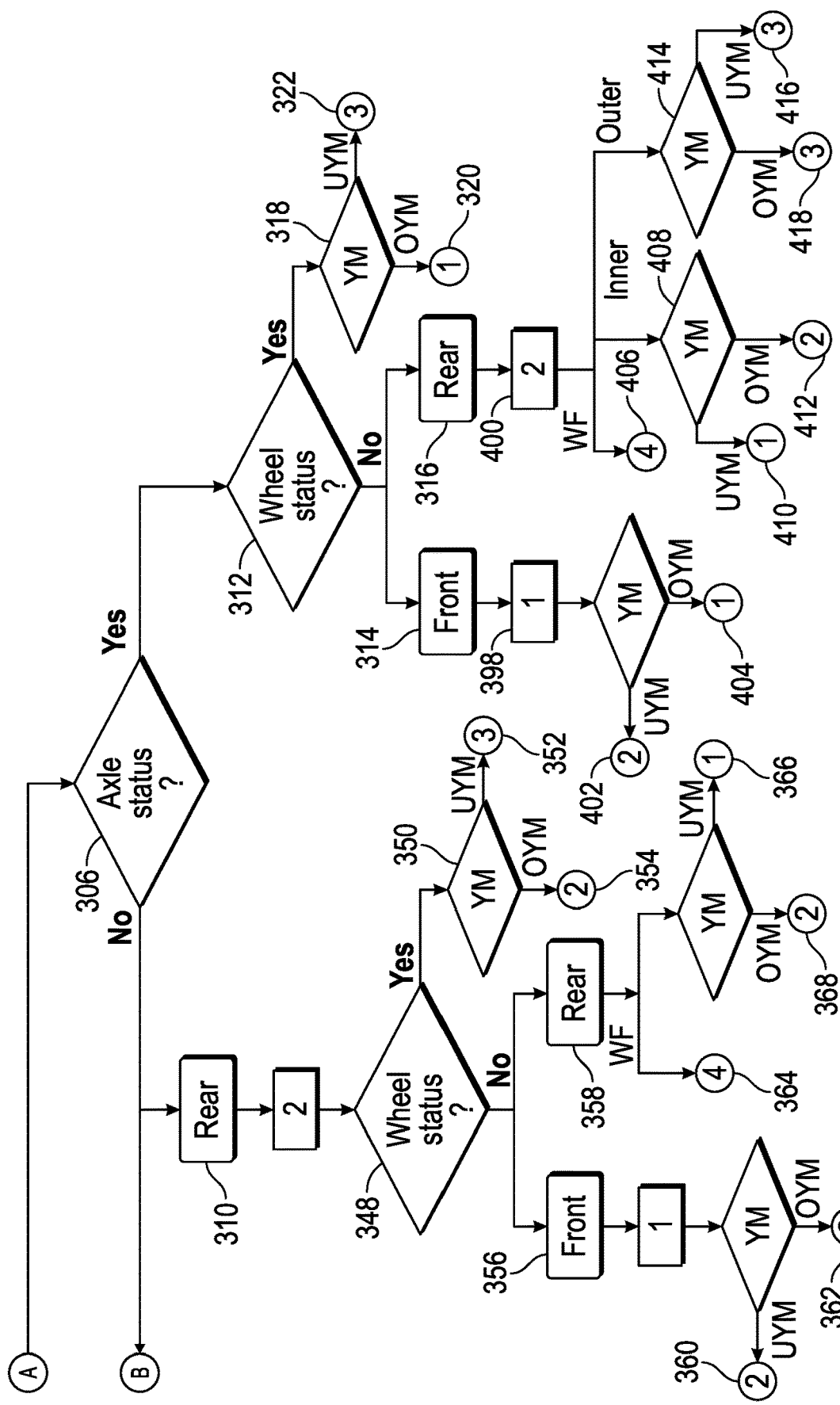

FIGS. 3B and 3C depict specific examples of usage of the method 300 depicted in overview in FIG. 3A. In particular, FIG. 3B depicts a situation in which the body 62 is found to be stable by the body control module 15, while the front axle 28 is found to be laterally saturated and one of the front wheels 27 is longitudinally saturated. Accordingly, the front axle 28 torque constraint is updated to ensure that additional torque is not sent to the front axle 28. More specifically, if at block 302, the body 62 is found to be stable, the method 300 proceeds to block 306 where the front axle 28 is laterally saturated. Accordingly, the front axle 28 torque constraint is updated to ensure that additional torque is not sent to the front axle 28 at block 308. If one of the rear wheels 27 is longitudinally saturated, the rear axle 30 torque constraint must similarly be updated to ensure that rear axle 30 torque is not further increased at block 334. Additionally, if there is wheel flare WF in the rear wheels at block 340, priority is given to wheel 27 control rather than to yaw tracking, and eventually the eLSD 36 is activated to decrease wheel flare WF, while the activation of the eLSD 36 may also generate an oversteer yaw moment OYM at block 342 and 346.

FIG. 3C, by contrast, depicts an example in which the body control module 15 finds that the body 62 is unstable at block 302. Accordingly, when the body 62 is unstable, the rear axle 30 torque constraint is updated to ensure that rear axle 30 torque is not increased at block 304. If the front axle 28 is laterally saturated at block 378 and there is wheel flare WF in the front wheels 27, then the front axle 28 torque constraint is also updated to ensure that front axle 28 torque is not further increased. The method 300 of each of FIGS. 3A-3C operates continuously and recursively while the vehicle is running. Additionally, the method 300 may operate both online and offline. In the foregoing, it should be appreciated that paths shown in FIGS. 3B and 3C are merely non-limiting exemplary decision paths using the logic of the method 300, and that many other possible decision paths are possible and intended to be within the scope of the present disclosure.

The system 10 and method 300 of system for supervisory control for eAWD 34 and eLSD 36 in a motor vehicle 12 of the present disclosure offer several advantages. These include providing a motor vehicle 12 driver or operator maximum feasible performance, stability, handling, maneuverability, steerability of the motor vehicle 12 in a wide variety of conditions, including in inclement weather, instances of tire 18 deformation, tire 18 wear, tire 18 temperature variations, tire 18 inflation levels, and the like. Additionally, the system 10 and method 300 may operate on a motor vehicle 12 in complex driving scenarios, including performance driving situations in which the driver may attempt a powerslide, drift, or the like, and the system 10 and method 300 will operate to provide an appropriate quantity of force generation at the tire 18/road interface or contact patch 38, while also providing maximum tire 18/road interface or contact patch 38 adhesion in driving scenarios in which maximum grip is desired. These benefits may all be obtained using the system 10 and method 300 described herein while maintaining or reducing cost and complexity, reducing calibration efforts, and improving simplicity, and while also providing increased redundancy and robustness.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A system for supervisory control for eAWD and eLSD in a motor vehicle, the system comprising:

one or more sensors disposed on the motor vehicle, the one or more sensors measuring real-time static and dynamic data about the motor vehicle;

one or more actuators disposed on the motor vehicle, the one or more actuators altering static and dynamic behavior of the motor vehicle;

a control module having a processor, a memory, and input/output (I/O) ports, the control module executing program code portions stored in the memory, the program code portions comprising:

a first program code portion that receives, via the I/O ports, the real-time static and dynamic data from the one or more sensors;

a second program code portion that receives, via the I/O ports, one or more driver inputs to the motor vehicle;

a third program code portion that determines a status of a body of the motor vehicle;

a fourth program code portion that determines a status of axles of the motor vehicle;

a fifth code portion that determines a status of each wheel of the motor vehicle;

a sixth program code portion that generates a control signal to the one or more actuators based on the driver inputs and based on the outputs of the third, fourth, and fifth program code portions; and a seventh program code portion that exercises supervisory control over at least the second and the sixth program code portions by actively adjusting constraints on the control signal to each of the one or more actuators based on the status of the body, the status of the axles, and the status of each wheel of the motor vehicle, wherein actively adjusting constraints on the control signal alters boundaries of control actions in response to the one or more driver inputs.

2. The system of claim 1, wherein the first program code portion further comprises:
receiving real-time static and dynamic data from one or more of:
inertial measurement units (IMUs) capable of measuring position, orientation, acceleration, and velocity in at least three dimensions;
wheel speed sensors capable of measuring angular speeds of each of the wheels of the motor vehicle;
throttle position sensors capable of measuring a throttle position of the motor vehicle;
accelerator position sensors capable of measuring a position of an accelerator pedal of the motor vehicle; and
tire pressure monitoring sensors capable of measuring pressures of tires of the motor vehicle, wherein the real-time static and dynamic data further includes:
lateral velocity of the motor vehicle;
longitudinal velocity of the motor vehicle;
yaw rate of the motor vehicle;
wheel angular velocity; and
longitudinal, lateral, and normal forces on each tire of the motor vehicle.

3. The system of claim 1, wherein the third program code portion further comprises program code portions that:
communicate via the I/O ports with a body control module;
receive, by the body control module, data from the one or more sensors; and
ascertain a stability status of the body of the motor vehicle, wherein the stability status of the body comprises: at least a yaw rate, a sideslip angle, and a longitudinal speed; and wherein when the stability status of the body is within predefined stability margins, the body control module sends a positive indicator to the seventh program code portion; and when the stability status of the body is not within predefined stability margins, the body control module sends a negative indicator to the seventh program code portion, wherein in response to a positive indicator, the seventh program code portion selectively commands additional torque transfer to one or more of the wheels or axles, and in response to a negative indicator, the seventh program code portion halts torque transfer to one or more of the wheels or axles.

4. The system of claim 3, wherein the stability status of the body is detected by comparing a measured yaw rate and a sideslip angle, wherein stability margins of the body are defined by:

$$r_{max \atop min} = \pm \frac{\mu g \xi_r}{v_x}; \text{ and}$$

$$\beta_{max \atop min} = \pm \mathrm{atan}\left(\frac{3\xi\mu F_z}{C_{\alpha r}}\right) + \frac{l_r r}{v_x}$$

where r is the yaw rate, β is the sideslip angle, $v_x$ is a longitudinal speed, $l_r$ is a distance from a center of gravity of the motor vehicle to a rear axle, and $l_f$ is the distance from the center of gravity to a front axle, l is the distance between front and rear axles, m is total mass of the motor vehicle, μ is a road coefficient of friction, and $C_\alpha$ is tire cornering stiffness.

5. The system of claim 1, wherein the fourth program code portion further comprises program code portions that:
communicate, via the I/O ports, with an axle monitoring module;
receive, by the axle monitoring module, data from the one or more sensors; and
ascertain a stability status of the axles of the motor vehicle, wherein the stability status of the axles comprises: ascertaining tire slip angles and slip ratios of each of the tires of the motor vehicle, and when the tires have exceeded predetermined tire slip angles and tire slip ratios, determining that predetermined tire stability margins have been exceeded, and when the tires have not exceeded predetermined tire slip angles and tire slip ratios, determining that predetermined tire stability margins have not been exceeded, wherein when the tire stability margins have been exceeded the axle monitoring module sends a negative indicator to the seventh program code portion and when the tires have not exceeded predetermined tire stability margins the axle monitoring module sends a positive indicator to the seventh program code portion, wherein in response to a positive indicator, the seventh program code portion selectively commands additional torque transfer to one or more of the axles, and in response to a negative indicator, the seventh program code portion halts torque transfer to one or more of the axles.

6. The system of claim 5, wherein the stability status of the axles of the motor vehicle is defined by a saturation level of the axles in terms of the slip angles α of the tires $$\alpha_{lim} = \mathrm{atan}\left(\frac{3\xi\mu F_z}{C_{\alpha r}}\right)$$

where $F_z$ is tire normal load, $C_\alpha$ is tire stiffness, and μ is a road coefficient of friction.

7. The system of claim 1, wherein the fifth program code portion further comprises program code portions that:
communicate, via the I/O ports, with a wheel stability module;
receive, by the wheel stability module, data from the one or more sensors; and
ascertain a stability status of the wheels of the motor vehicle, wherein the stability status of the wheels includes estimated slip ratios of each tire of the motor vehicle.

8. The system of claim 7, wherein when the estimated slip ratios exceed predetermined stability margins, the wheel stability module sends a negative indicator to the seventh program code portion, and when the estimated slip ratios do not exceed predetermined stability margins, the wheel stability module sends a positive indicator to the seventh program code portion, wherein in response to a positive indicator the seventh program code portion selectively commands additional torque transfer to one or more of the wheels, and wherein in response to a negative indicator the seventh program code portion halts torque transfer to one or more of the wheels.

9. The system of claim 1 wherein the sixth program code portion further comprises program code portions that:
receive driver inputs including steering and torque requests;
receive a stability status of the body, the axles, and the wheels of the motor vehicle; and
based on the actuator types of the one or more actuators equipped to the motor vehicle, and based on the stability status of the body, the axles, and the wheels of the motor vehicle, the system generates the control signal to the one or more actuators.

10. The system of claim 9, wherein the seventh program code portion further comprises program code portions that:
actively optimize constraints for each of the one or more actuators to account for the stability status of the body, the axles, and the wheels of the motor vehicle; and
actively adjust control signals to the one or more actuators so that the control signals to the one or more actuators are within boundaries of possible actuator outputs.

11. A method for supervisory control for eAWD and eLSD in a motor vehicle, the method comprising:
processing static and dynamic motor vehicle information through a control module, the control module having a processor, a memory, and input/output (I/O) ports, the control module executing program code portions stored in the memory, the program code portions:
measuring real-time static and dynamic data with one or more sensors disposed on the motor vehicle;
utilizing one or more actuators disposed on the motor vehicle to alter static and dynamic behavior of the motor vehicle;
receiving, via the I/O ports, the real-time static and dynamic data from the one or more sensors;
receiving, via the I/O ports, one or more driver inputs to the motor vehicle;
determining a status of a body of the motor vehicle;
determining a status of axles of the motor vehicle;
determining a status of each wheel of the motor vehicle;
generating a control signal to the one or more actuators based on the driver inputs
and based on the status of the body, the axles, and each wheel of the motor vehicle; and
exercising supervisory control over at least the driver inputs and the control signal to the one or more actuators by actively adjusting constraints on the control signal to each of the one or more actuators based on the status of the body, the status of the axles, and the status of each wheel of the motor vehicle, wherein actively adjusting constraints on the control signal alters boundaries of control actions in response to the one or more driver inputs.

12. The method of claim 11, further comprising:
receiving real-time static and dynamic data from one or more of:
inertial measurement units (IMUs) capable of measuring position, orientation, acceleration, and velocity in at least three dimensions;
wheel speed sensors capable of measuring angular speeds of each of the wheels of the motor vehicle;
throttle position sensors capable of measuring a throttle position of the motor vehicle;
accelerator position sensors capable of measuring a position of an accelerator pedal of the motor vehicle; and
tire pressure monitoring sensors capable of measuring pressures of tires of the motor vehicle, wherein the real-time static and dynamic data further includes:
lateral velocity of the motor vehicle;
longitudinal velocity of the motor vehicle;
yaw rate of the motor vehicle;
wheel angular velocity; and
longitudinal, lateral, and normal forces on each tire of the motor vehicle.

13. The method of claim 11, further comprising:
communicating via the I/O ports with a body control module;
receiving, by the body control module, data from the one or more sensors; and
ascertaining a stability status of the body of the motor vehicle, wherein the stability status of the body comprises: at least a yaw rate, a sideslip angle, and a longitudinal speed; and
when the stability status of the body is within predefined stability margins, sending by the body control module, a positive indicator to the control module; and when the stability status of the body is not within predefined stability margins, sending by the body control module, a negative indicator to the control module, wherein in response to a positive indicator, the control module selectively commands additional torque transfer to one or more of the wheels or axles, and in response to a negative indicator, the control module halts torque transfer to one or more of the wheels or axles.

14. The method of claim 13, wherein ascertaining a stability status of the body further comprises:
comparing a measured yaw rate and a sideslip angle, wherein stability margins of the body are defined by:

$$r_{max \atop min} = \pm \frac{\mu g \xi_r}{v_x}; \text{ and}$$

$$\beta_{max \atop min} = \pm \mathrm{atan}\left(\frac{3\xi\mu F_z}{C_{\alpha r}}\right) + \frac{l_r r}{v_x}$$

where r is the yaw rate, β is the sideslip angle, $v_x$ is a longitudinal speed, $l_r$ is a distance from a center of gravity of the motor vehicle to a rear axle, and $l_f$ is the distance from the center of gravity to a front axle, l is the distance between front and rear axles, m is total mass of the motor vehicle, μ is a road coefficient of friction, and $C_\alpha$ is tire cornering stiffness.

15. The method of claim 11, further comprising:
communicating, via the I/O ports, with an axle monitoring module;
receiving, by the axle monitoring module, data from the one or more sensors; and
ascertaining a stability status of the axles of the motor vehicle, wherein the stability status of the axles comprises: ascertaining tire slip angles and slip ratios of each of the tires of the motor vehicle, and when the tires have exceeded predetermined tire slip angles and tire slip ratios, determining that predetermined tire stability margins have been exceeded, and when the tires have not exceeded predetermined tire slip angles and tire slip ratios, determining that predetermined tire stability margins have not been exceeded, wherein when the tire stability margins have been exceeded the axle monitoring module sends a negative indicator to the control module and when the tires have not exceeded predetermined tire stability margins the axle monitoring module sends a positive indicator to the control module, wherein in response to a positive indicator, the control module selectively commands additional torque transfer to one or more of the axles, and in response to a negative indicator, the control module halts torque transfer to one or more of the axles.

16. The method of claim 15, wherein ascertaining a stability status of the axles of the motor vehicle further comprises:

defining the stability status of the axles of the motor vehicle is through a saturation level of the axles in terms of the slip angles α of the tires $$\alpha_{lim} = \operatorname{atan}\left(\frac{3\xi\mu F_z}{C_{\alpha r}}\right)$$

where $F_z$ is tire normal load, $C_\alpha$ is tire stiffness, and μ is a road coefficient of friction.

17. The method of claim 11, further comprising:
communicating, via the I/O ports, with a wheel stability module;
receiving, by the wheel stability module, data from the one or more sensors; and
ascertaining a stability status of the wheels of the motor vehicle, wherein the stability status of the wheels includes estimated slip ratios of each tire of the motor vehicle.

18. The method of claim 17, further comprising:
sending, by the wheel stability module, a negative indicator to the control module when the estimated slip ratios exceed predetermined stability margins; and
sending, by the wheel stability module, a positive indicator to the control module when the estimated slip ratios do not exceed predetermined stability margins, wherein in response to a positive indicator the control module selectively commands additional torque transfer to one or more of the wheels, and wherein in response to a negative indicator the control module halts torque transfer to one or more of the wheels.

19. The method of claim 11 further comprising:
receiving driver inputs including steering and torque requests;
receiving a stability status of the body, the axles, and the wheels of the motor vehicle; and
generating the control signal based on the actuator types of the one or more actuators equipped to the motor vehicle, and based on the stability status of the body, the axles, and the wheels of the motor vehicle, wherein the control signal is adjusted by actively optimizing constraints for each of the one or more actuators to account for the stability status of the body, the axles, and the wheels of the motor vehicle as well as the driver input signal, wherein the control signals to the one or more actuators are within boundaries of possible actuator outputs.

20. A method for supervisory control for eAWD and eLSD in a motor vehicle, the method comprising:
processing static and dynamic motor vehicle information through a control module, the control module having a processor, a memory, and input/output (I/O) ports, the control module executing program code portions stored in the memory, the program code portions:
measuring real-time static and dynamic data with one or more sensors disposed on the motor vehicle;
utilizing one or more actuators disposed on the motor vehicle to alter static and dynamic behavior of the motor vehicle;
receiving, via the I/O ports, the real-time static and dynamic data from the one or more sensors;
receiving, via the I/O ports, one or more driver inputs to the motor vehicle;
communicating via the I/O ports with a body control module;
receiving, by the body control module, data from the one or more sensors; and
ascertaining a stability status of the body of the motor vehicle, wherein the stability status of the body comprises: at least a yaw rate, a sideslip angle, and a longitudinal speed and the stability status is obtained by:
comparing a measured yaw rate and a sideslip angle, wherein stability margins of the body are defined by:

$$r_{\substack{max \\ min}} = \pm \frac{\mu g \xi_r}{v_x}; \text{ and}$$

$$\beta_{\substack{max \\ min}} = \pm \operatorname{atan}\left(\frac{3\xi\mu F_z}{C_{\alpha r}}\right) + \frac{l_r r}{v_x}$$

where r is the yaw rate, β is the sideslip angle, $v_x$ is a longitudinal speed, $l_r$ is a distance from a center of gravity of the motor vehicle to a rear axle, and $l_f$ is the distance from the center of gravity to a front axle, l is the distance between front and rear axles, m is total mass of the motor vehicle, μ is a road coefficient of friction, and $C_\alpha$ is tire cornering stiffness; and when the stability status of the body is within predefined stability margins, sending by the body control module, a positive indicator to the control module; and when the stability status of the body is not within predefined stability margins, sending by the body control module, a negative indicator to the control module, wherein in response to a positive indicator, the control module selectively commands additional torque transfer to one or more of wheels or axles, and in response to a negative indicator, the control module halts torque transfer to one or more of the wheels or axles;
communicating, via the I/O ports, with an axle monitoring module;
receiving, by the axle monitoring module, data from the one or more sensors;
ascertaining a stability status of the axles of the motor vehicle, where the stability status of the axles of the motor vehicle is defined through a saturation level of the axles in terms of slip angles α of the tires $$\alpha_{lim} = \operatorname{atan}\left(\frac{3\xi\mu F_z}{C_{\alpha r}}\right)$$

where $F_z$ is tire normal load, $C_\alpha$ is tire stiffness, and μ is the coefficient of friction of the road,
wherein the stability status of the axles comprises: ascertaining tire slip angles and slip ratios of each of the tires of the motor vehicle, and when the tires have exceeded predetermined tire slip angles and tire slip ratios, determining that predetermined tire stability margins have been exceeded, and when the tires have not exceeded predetermined tire slip angles and tire slip ratios, determining that predetermined tire stability margins have not been exceeded, wherein when the tire stability margins have been exceeded the axle monitoring module sends a negative indicator to the control module and when the tires have not exceeded predetermined tire stability margins the axle monitoring module sends a positive indicator to the control module, wherein in response to a positive indicator, the control module selectively commands additional torque transfer to one or more of the axles, and in response to a negative indicator, the control module halts torque transfer to one or more of the axles;

communicating, via the I/O ports, with a wheel stability module;

receiving, by the wheel stability module, data from the one or more sensors;

ascertaining a stability status of the wheels of the motor vehicle, wherein the stability status of the wheels includes estimated slip ratios of each tire of the motor vehicle;

sending, by the wheel stability module, a negative indicator to the control module when the estimated slip ratios exceed predetermined stability margins;

sending, by the wheel stability module, a positive indicator to the control module when the estimated slip ratios do not exceed predetermined stability margins, wherein in response to a positive indicator the control module selectively commands additional torque transfer to one or more of the wheels, and wherein in response to a negative indicator the control module halts torque transfer to one or more of the wheels;

generating a control signal to the one or more actuators based on the driver inputs and based on the status of the body, the axles, and each wheel of the motor vehicle; and exercising supervisory control over at least the driver inputs and the control signal to the one or more actuators by actively adjusting constraints on the control signal to each of the one or more actuators based on the status of the body, the status of the axles, and the status of each wheel of the motor vehicle, wherein actively adjusting constraints on the control signal alters boundaries of control actions in response to the one or more driver inputs such that the control signals to the one or more actuators are within boundaries of possible actuator outputs.

* * * * *